US012626260B2

(12) United States Patent
Wong et al.

(10) Patent No.: US 12,626,260 B2
(45) Date of Patent: *May 12, 2026

(54) TRAINING A MACHINE LEARNING SYSTEM FOR TRANSACTION DATA PROCESSING

(71) Applicant: Featurespace Limited, Cambridge (GB)

(72) Inventors: Kenny Wong, Cambridge (GB); David Sutton, Milton (GB); Iker Perez, Stapleford (GB); Alec Barns-Graham, Cambridge (GB)

(73) Assignee: Featurespace Limited, Cambridge (GB)

( * ) Notice: Subject to any disclaimer, the term of this patent is extended or adjusted under 35 U.S.C. 154(b) by 69 days.

This patent is subject to a terminal disclaimer.

(21) Appl. No.: 18/882,198

(22) Filed: Sep. 11, 2024

(65) Prior Publication Data

US 2025/0005580 A1 Jan. 2, 2025

Related U.S. Application Data

(63) Continuation of application No. 17/420,159, filed as application No. PCT/EP2021/063767 on May 24, 2021, now Pat. No. 12,118,559.

(Continued)

(51) Int. Cl.
*G06Q 20/40* (2012.01)
*G06N 3/04* (2023.01)
(Continued)

(52) U.S. Cl.
CPC .......... *G06Q 20/4016* (2013.01); *G06N 3/04* (2013.01); *G06N 3/045* (2023.01); *G06Q 20/085* (2013.01);
(Continued)

(58) Field of Classification Search
None
See application file for complete search history.

(56) References Cited

U.S. PATENT DOCUMENTS 11,146,576 B1 * 10/2021 Mushtaq ............. H04L 63/1416
2006/0059568 A1 3/2006 Smith-Michelson et al.
(Continued)

FOREIGN PATENT DOCUMENTS

CN 107645533 1/2018
CN 110738559 1/2020
(Continued)

OTHER PUBLICATIONS

Author: Li Title: A Time Attention based Fraud Transaction Detection Framework (Year: 2019).*

(Continued)

*Primary Examiner* — Bennett M Sigmond
*Assistant Examiner* — Bhavin D Shah
(74) *Attorney, Agent, or Firm* — King & Spalding

(57) ABSTRACT

A method of training a supervised machine learning system to detect anomalies within transaction data is described. The method includes obtaining a training set of data samples; assigning a label indicating an absence of an anomaly to unlabelled data samples in the training set; partitioning the data of the data samples in the training set into two feature sets, a first feature set representing observable features and a second feature set representing context features; generating synthetic data samples by combining features from the two feature sets that respectively relate to two different uniquely identifiable entities; assigning a label indicating a presence of an anomaly to the synthetic data samples; augmenting the training set with the synthetic data samples; and training a supervised machine learning system with the augmented training set and the assigned labels.

10 Claims, 18 Drawing Sheets

Related U.S. Application Data

(60) Provisional application No. 63/049,873, filed on Jul. 9, 2020.

(51) Int. Cl.

| | |
|---|---|
| *G06N 3/045* | (2023.01) |
| *G06Q 20/08* | (2012.01) |
| *G06Q 20/38* | (2012.01) |
| *G06Q 40/02* | (2023.01) |
| *H04L 9/40* | (2022.01) |

(52) U.S. Cl.
CPC ....... *G06Q 20/389* (2013.01); *G06Q 20/4015* (2020.05); *G06Q 40/02* (2013.01)

(56) References Cited

U.S. PATENT DOCUMENTS

| | | | |
|---|---|---|---|
| 2008/0120166 | A1 | 5/2008 | Fernandez |
| 2014/0180974 | A1 | 6/2014 | Kennel et al. |
| 2017/0230404 | A1 | 8/2017 | Araujo et al. |
| 2021/0248448 | A1 | 8/2021 | Branco et al. |
| 2023/0118240 | A1 | 4/2023 | Wong et al. |
| 2024/0232889 | A1 | 7/2024 | Skalski et al. |

FOREIGN PATENT DOCUMENTS

| | | | | |
|---|---|---|---|---|
| CN | 110348580 | 5/2022 | | |
| GB | 2321362 | 7/1998 | | |
| WO | WO 2018/167404 | 9/2018 | | |
| WO | WO 2020060544 | 9/2018 | | |
| WO | WO 2019050864 | 3/2019 | | |
| WO | WO 2019050865 | 3/2019 | | |
| WO | WO-2020060544 A1 * | 3/2020 | ............ | G06F 17/18 |
| WO | WO 2020088007 | 5/2020 | | |
| WO | WO 2022/008131 | 1/2022 | | |
| WO | WO 2022008130 | 1/2022 | | |

OTHER PUBLICATIONS

Author: Steyn Title: Semi-supervised machine learning for textual anomaly detection (Year: 2016).*

Author: Prusti Title: Fraudulent Transaction Detection in Credit Card by Applying Ensemble Machine Learning techniques (Year: 2019).*

Li. A Time Attention Based Fraud Transaction Detection Framework. 2019.

Steyn. Semi-Supervised Machine Learning for Textual Anomaly Detection. 2016.

Prusti. Fraudulent Transaction Detection in Credit Card by Applying Ensemble Machine Learning Techniques. 2019.

International Search Report for PCT/EP2021/063766, issued Oct. 6, 2021.

International Search Report for PCT /EP2021/063767, issued Oct. 25, 2021.

Search and Examination Report for UK Patent Application No. 2107388.7, issued Jul. 15, 2021.

Search and Examination Report for UK Patent Application No. 2107389.5, issued Jul. 14, 2021.

Longfei Li et al: "A Time Attention based Fraud Transaction Detection Framework", arxiv.org, Cornell University Library, 201 Olin Library Cornell University Ithaca, NY 14853, Dec. 26, 2019.

Xurui Li et al: "Transaction Fraud Detection Using GRU-centered Sandwich-structured Model", arxiv.org, Cornell University Library, 201 Olin Library Cornell University Ithaca, NY 14853, Nov. 4, 2017.

Liu Gu Annan et al: "Fraud detection via behavioral sequence embedding", Knowledge and Information Systems, Springer Verlag, London, GB, vol. 62, No. 7, Jan. 9, 2020.

Vaswani et al., "Attention is All You Need", available at: https://arxiv.org/abs/1706.03762v5 [accessed Jul. 13, 20211.

Chou Hsin-Ping et al: "Remix: Rebalanced Mixup" In: "Advances in Intelligent Data Analysis XIX". Jul. 8, 2020.

Connor Shorten et al: "A survey on Image Data Augmentation for Deep Learning", Journal of Big Data, vol. 6, Jul. 6, 2019.

International Search Report for PCT/EP2022/061405, issued Dec. 20, 2022.

Search and Examination Report for GB Patent Application No. GB2206208.7, issued Oct. 25, 2022.

Li, Longfei et al., "A Time Attention based Fraud Transaction Detection Framework", Conference, Jul. 17, 2017, Washington DC, USA.

Refka Abdellaoui et al: "Secure Communication for Internet Payment in Heterogeneous Networks", Adv an Ced Information Networking and Applications (AINA), 2010 24 Th IEEE International Conference On, IEEE, Piscataway, NJ, USA, Apr. 20, 2010 (Apr. 20, 2010), pp. 1085-1092.

\* cited by examiner

1200

1202 — Obtain Training Set

1204 — Assign Non-Anomaly Label

1206 — Partition Data Samples

1208 — Generate Synthetic Data Samples

1210 — Assign Anomaly Label to Synthetic Data Samples

1212 — Augment Training Set with Labelled Synthetic Data Samples

1214 — Train Supervised ML System

1300

1302 — Receive Transaction Data

1304 — Generate First Set of Features

1306 — Determine UIE

1308 — Obtain Ancillary Data for UIE

1310 — Generate Second Set of Features

1312 — Generate Input Data for ML System

1314 — Apply ML System to First and Second Sets of Features

1316 — Selectively Label Received Transaction Data

TRAINING A MACHINE LEARNING SYSTEM FOR TRANSACTION DATA PROCESSING

CROSS-REFERENCE TO RELATED APPLICATION

This application is a continuation of U.S. patent application Ser. No. 17/420,159, filed Jul. 1, 2021, which is a national phase application under 35 U.S.C. § 371 of International Application No. PCT/EP2021/063767, filed May 24, 2021, which claims priority to U.S. Provisional Application No. 63/049,873, filed Jul. 9, 2020. The contents of each of the above-identified applications is hereby fully incorporated herein by reference.

TECHNICAL FIELD

The present invention relates to systems and methods for applying machine learning systems to transaction data. Certain examples relate to a machine learning system for use in real-time transaction processing. Certain examples relate to a method for training a machine learning system for use in real-time transaction processing.

BACKGROUND

Digital payments have exploded over the last twenty years, with more than three-quarters of global payments using some form of payment card or electronic wallet. Point of sale systems are progressively becoming digital rather than cash based. Put simply, global systems of commerce are now heavily reliant on electronic data processing platforms. This presents many engineering challenges that are primarily hidden from a lay user. For example, digital transactions need to be completed in real-time, i.e. with a minimal level of delay experienced by computer devices at the point of purchase. Digital transactions also need to be secure and resistant to attack and exploitation. The processing of digital transactions is also constrained by the historic development of global electronic systems for payments. For example, much infrastructure is still configured around models that were designed for mainframe architectures in use over 50 years ago.

As digital transactions increase, new security risks also become apparent. Digital transactions present new opportunities for fraud and malicious activity. In 2015, it was estimated that 7% of digital transactions were fraudulent, and that figure has only increased with the transition of more economic activity online. Fraud losses are estimated to be four times the population of the world (e.g., in US dollars) and are growing.

While risks like fraud are an economic issue for companies involved in commerce, the implementation of technical systems for processing transactions is an engineering challenge. Traditionally, banks, merchants and card issuers developed "paper" rules or procedures that were manually implemented by clerks to flag or block certain transactions. As transactions became digital, one approach to building technical systems for processing transactions has been to supply computer engineers with these sets of developed criteria and to ask the computer engineers to implement them using digital representations of the transactions, i.e. convert the hand-written rules into coded logic statements that may be applied to electronic transaction data. This traditional approach has run into several problems as digital transaction volumes have grown. First, any applied processing needs to take place at "real-time". e.g. with millisecond latencies. Second, many thousands of transactions need to be processed every second (e.g., a common "load" may be 1000-2000 per second), with load varying unexpectedly over time (e.g., a launch of a new product or a set of tickets can easily increase an average load level by several multiples). Third, the digital storage systems of transaction processors and banks are often siloed or partitioned for security reasons, yet digital transactions often involve an interconnected web of merchant systems. Fourthly, large scale analysis of actual reported fraud and predicted fraud is now possible. This shows that traditional approaches to fraud detection are found wanting; accuracy is low and false positives are high. This then has a physical effect on digital transaction processing, more genuine point-of-sale and online purchases are declined and those seeking to exploit the new digital systems often get away with it.

In the last few years, a more machine learning approach has been taken to the processing of transaction data. As machine learning models mature in academia, engineers have begun to attempt to apply them to the processing of transaction data. However, this again runs into problems. Even if engineers are provided with an academic or theoretical machine learning model and asked to implement it, this is not straightforward. For example, the problems of large-scale transaction processing systems come into play. Machine learning models do not have the luxury of unlimited inference time as in the laboratory. This means that it is simply not practical to implement certain models in a real-time setting, or that they need significant adaptation to allow real-time processing in the volume levels experienced by real-world servers. Moreover, engineers need to contend with the problem of implementing machine learning models on data that is siloed or partitioned based on access security, and in situations where the velocity of data updates is extreme. The problems faced by engineers building transaction processing systems may thus be seen as akin to those faced by network or database engineers; machine learning models need to be applied but meeting system throughput and query response time constraints set by the processing infrastructure. There are no easy solutions to these problems. Indeed, the fact that many transaction processing systems are confidential, proprietary, and based on old technologies means that engineers do not have the body of knowledge developed in these neighbouring fields and often face challenges that are unique to the field of transaction processing. Moreover, the field of large-scale practical machine learning is still young, and there are few established design patterns or textbooks that engineers can rely on.

SUMMARY

Aspects of the present invention are set out in the appended independent claims. Certain variations of the invention are then set out in the appended dependent claims. Further aspects, variations and examples are presented in the detailed description below.

BRIEF DESCRIPTION OF THE DRAWINGS

Examples of the invention will now be described, by way of example only, with reference to the accompanying drawings, in which.

DETAILED DESCRIPTION

Introduction

Certain examples described herein relate to a machine learning system for use in transaction processing. In certain examples, a machine learning system is applied in real-time, high-volume transaction processing pipelines to provide an indication of whether a transaction or entity matches previously observed and/or predicted patterns of activity or actions, e.g. an indication of whether a transaction or entity is "normal" or "anomalous" The term "behavioural" is used herein to refer to this pattern of activity or actions. The indication may comprise a scalar value normalised within a predefined range (e.g., 0 to 1) that is then useable to prevent fraud and other misuse of payment systems. The machine learning systems may apply machine learning models that are updated as more transaction data is obtained, e.g. that are constantly trained based on new data, so as to reduce false positives and maintain accuracy of the output metric. The present examples may be particularly useful for preventing fraud in cases where the physical presence of a payment card cannot be ascertained (e.g., online transactions referred to as "card-not-present") or for commercial transactions where high-value transactions may be routine and where it may be difficult to classify patterns of behaviour as "unexpected". As such, the present examples facilitate the processing of transactions as these transactions to being primarily "online", i.e. conducted digitally over one or more public communications networks.

Certain examples described herein allow machine learning models to be tailored to be specific to certain entities, such as account holders and merchants. For example, the machine learning models may model entity-specific patterns of behaviour as opposed to general group or aggregate behaviour that results in poor accuracy. The machine learning systems described herein are able to provide dynamically updating machine learning models despite large transaction flows and/or despite the need for segregation of different data sources.

The present examples may be applied to a wide variety of digital transactions, including, but not limited to, card payments, so-called "wire" transfers, peer-to-peer payments, Bankers' Automated Clearing System (BACS) payments, and Automated Clearing House (ACH) payments. The output of the machine learning system may be used to prevent a wide variety of fraudulent and criminal behaviour such as card fraud, application fraud, payment fraud, merchant fraud, gaming fraud and money laundering.

The present example machine learning systems, e.g. as configured and/or as trained according to FIGS. 1A to 13 below, allow for fast inference that can be easily parallelised to provide second or sub-second processing latencies and to manage large processing values (e.g., billions of transactions a year).

Figure 6A:
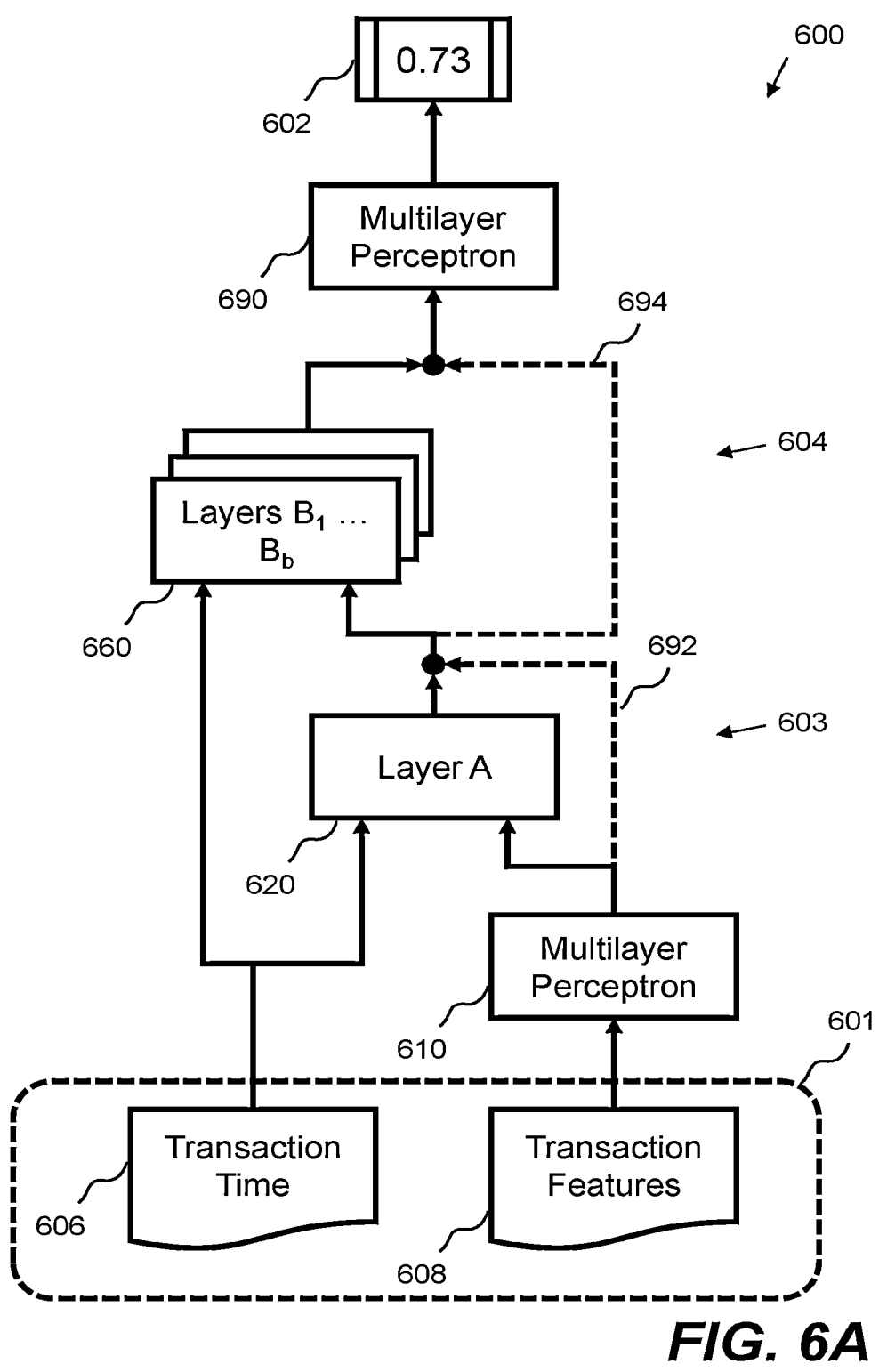
FIG. 6A is a schematic diagram showing a set of example components for a first configuration of a machine learning system for the processing of transaction data.
Figure 6B:
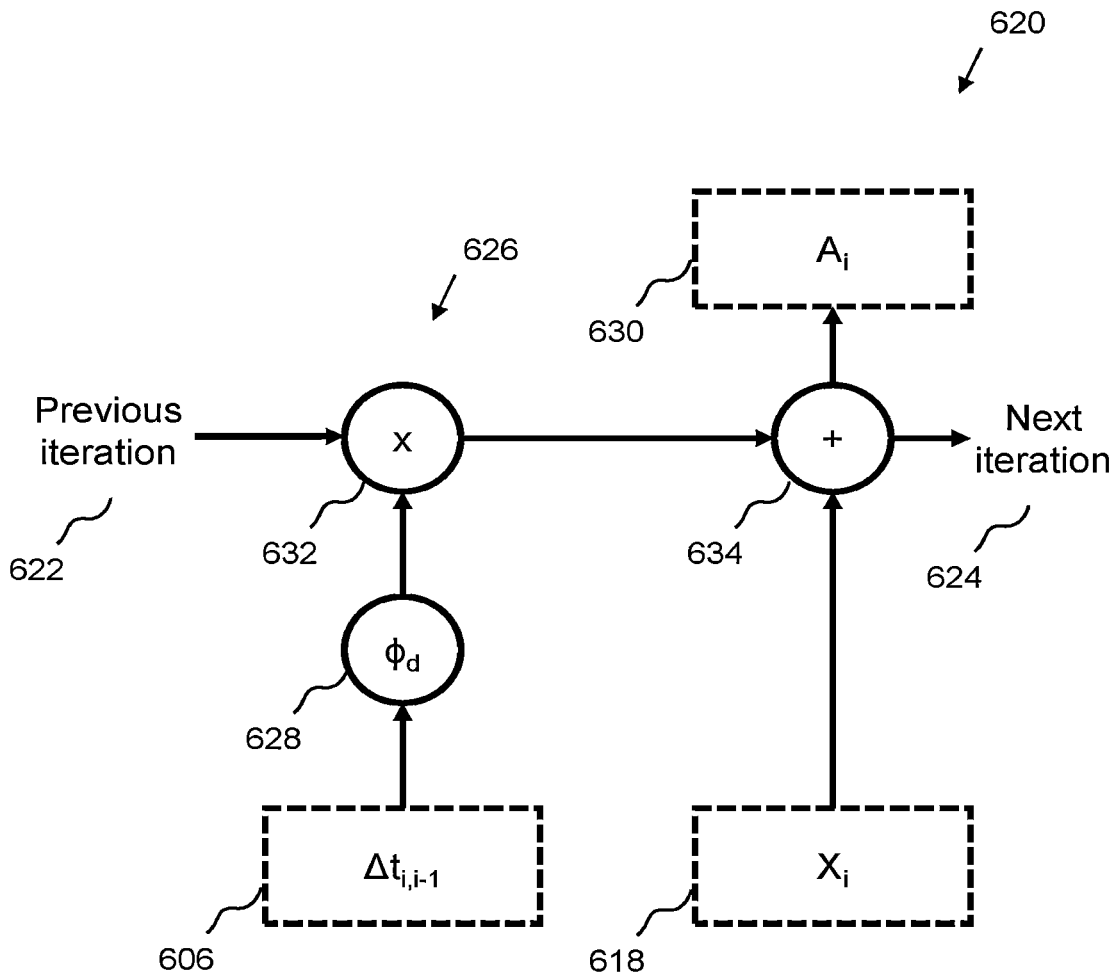
FIG. 6B is a schematic diagram showing a first stage for the example machine learning system of FIG. 6A.
Figure 6C:
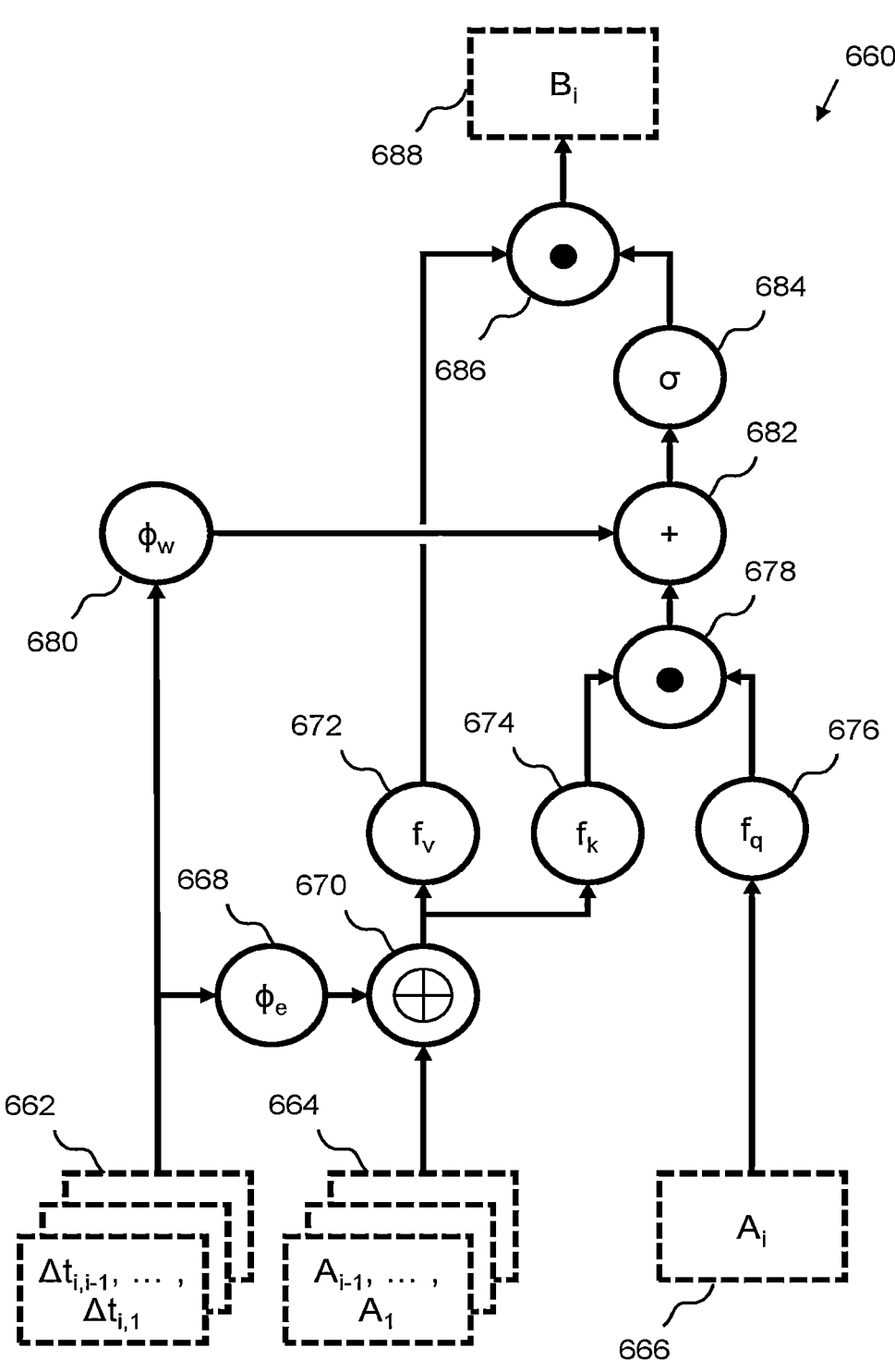
FIG. 6C is a schematic diagram showing a second stage for the example machine learning system of FIG. 6B.
Figure 7:
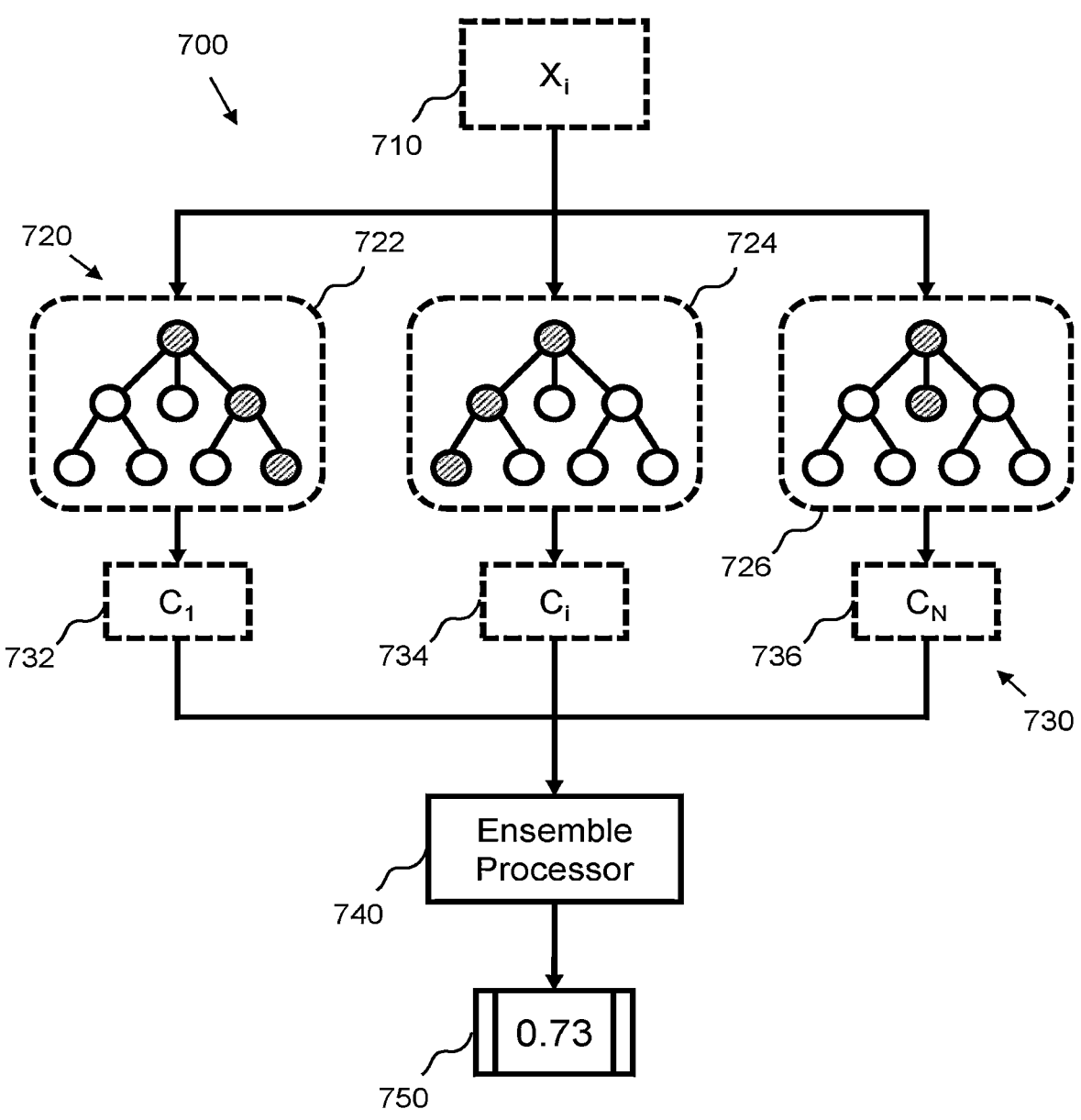
FIG. 7 is a schematic diagram showing a set of example components for a second configuration of a machine learning system for the processing of transaction data.
Figure 8:
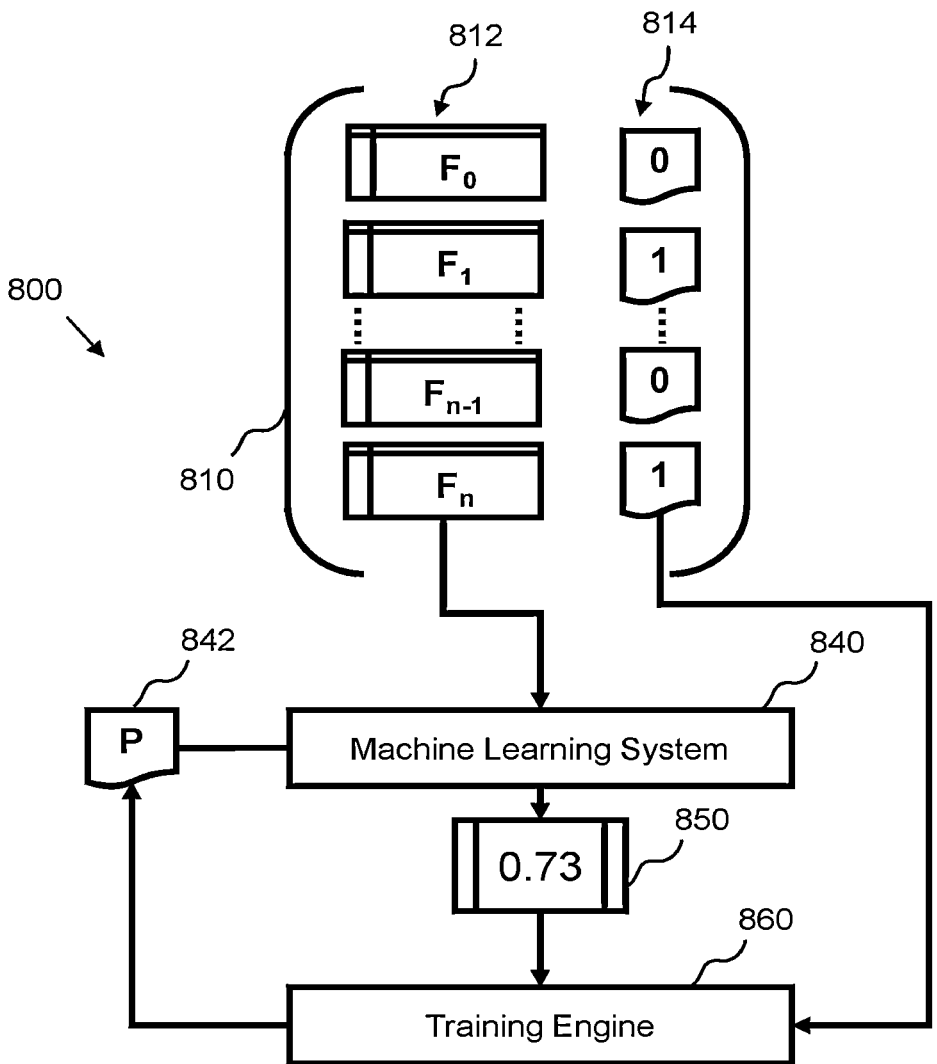
FIG. 8 is a schematic diagram showing an example training configuration for a machine learning system.

Two particular aspects are described below. FIGS. 1A to 5B provide context for both aspects. A first aspect relates to a machine learning system in the form of a specific neural network architecture as is shown in FIGS. 6A to 6C. A second aspect relates specifically to a method of training a machine learning system and is described with reference to FIGS. 9 to 13. The first and second aspects may preferably be applied separately and independently. For example, FIGS. 7 and 8 provide examples of alternative machine learning systems that may be trained according to the second aspect and FIG. 8 shows an alternative method for training the machine learning system described with reference to the first aspect. However, in certain cases they may be applied together, e.g. the method of training of the second aspect may be applied to train the machine learning system of the first aspect. Both aspects provide specific technical benefits as compared to other systems and methods and these are set out in the text below.

Certain Term Definitions

The terms "data" is used in different contexts herein to refer to digital information, such as that represented by known bit structures within one or more programming languages. In use, data may refer to digital information that is stored as bit sequences within computer memory. Certain machine learning models may operate on structured arrays of data of a predefined bit format. Using terms of the art, these may be referred to a multidimensional arrays or "tensors". It should be noted that for machine learning methods multidimensional arrays, e.g. with a defined extent in multiple dimensions, may be "flattened" so as to be represented (e.g., within memory) as a sequence or vector of values stored according to the predefined format (e.g., n-bit integer or floating point number, signed or unsigned). Hence, the term "tensor" as used herein covers multidimensional arrays with one or more dimensions (e.g., vectors, matrixes, volumetric arrays etc).

The term "structured numeric representation" is used to refer to numeric data in a structured form, such as an array of one or more dimensions that stores numeric values with a common data type, such as integers or float values. A structured numeric representation may comprise a tensor (as used within machine learning terminology). A structured numeric representation is typically stored as a set of indexed and/or consecutive memory locations, e.g. a one-dimensional array of 64-bit floats may be represented in computer memory as a consecutive sequence of 64-bit memory locations in a 64-bit computing system.

The term "transaction data" is used herein to refer to electronic data that is associated with a transaction. A transaction comprises a series of communications between different electronic systems to implement a payment or exchange. In general, transaction data may comprise data indicating events (e.g., actions undertaken in time) that relate to, and may be informative for, transaction processing. Transaction data may comprise structured, unstructured and semi-structured data. Transaction data may also include data associated with a transaction, such as data used to process a transaction. In certain cases, transaction data may be used broadly to refer actions taken with respect to one or more electronic devices. Transaction data may take a variety of forms depending on the precise implementation. However, different data types and formats may be converted by pre or post processing as appropriate.

The term "interface" is used herein to refer to any physical and/or logical interface that allows for one or more of data input and data output. An interface may be implemented by a network interface adapted to send and/or receive data, or by retrieving data from one or more memory locations, as implemented by a processor executing a set of instructions. An interface may also comprise physical (network) couplings over which data is received, such as hardware to allow for wired or wireless communications over a particular medium. An interface may comprise an application programming interface and/or a method call or return. For example, in a software implementation, an interface may comprise passing data and/or memory references to a function initiated via a method call, where the function comprises computer program code that is executed by one or more processors; in a hardware implementation, an interface may comprise a wired interconnect between different chips, chipsets or portions of chips. In the drawings, an interface may be indicated by a boundary of a processing block that has an inward and/or outward arrow representing a data transfer.

The terms "component" and "module" are used interchangeably to refer to either a hardware structure that has a specific function (e.g., in the form of mapping input data to output data) or a combination of general hardware and specific software (e.g., specific computer program code that is executed on one or more general purpose processors). A component or module may be implemented as a specific packaged chipset, for example, an Application Specific Integrated Circuit (ASIC) or a programmed Field Programmable Gate Array (FPGA), and/or as a software object, class, class instance, script, code portion or the like, as executed in use by a processor.

The term "machine learning model" is used herein to refer to at least a hardware-executed implementation of a machine learning model or function. Known models within the field of machine learning include logistic regression models, Naïve Bayes models, Random Forests, Support Vector Machines and artificial neural networks. Implementations of classifiers may be provided within one or more machine learning programming libraries including, but not limited to, scikit-learn, TensorFlow, and PyTorch.

The term "map" is used herein to refer to the transformation or conversion of a first set of data values to a second set of data values. The two sets of data values may be arrays of different sizes, with an output array being of lower dimensionality than an input array. The input and output arrays may have common or different data types. In certain examples, the mapping is a one-way mapping to a scalar value.

The term "neural network architecture" refers to a set of one or more artificial neural networks that are configured to perform a particular data processing task. For example, a "neural network architecture" may comprise a particular arrangement of one or more neural network layers of one or more neural network types. Neural network types include convolutional neural networks, recurrent neural networks, and feed-forward neural networks. Convolutional neural networks involve the application of one or more convolution operations. Recurrent neural networks involve an internal state that is updated during a sequence of inputs. Recurrent neural networks are thus seen as including a form of recurrent or feedback connection whereby a state of the recurrent neural network at a given time or iteration (e.g., t) is updated using a state of the recurrent neural network at a previous time or iteration (e.g., t−1). Feed-forward neural networks involve transformation operations with no feedback, e.g. operations are applied in a one-way sequence from input to output. Feed-forward neural networks are sometimes referred to as plain "neural networks", "multilayer perceptrons", "fully-connected" neural networks, or "dense", "linear", or "deep" neural networks (the latter when they comprise multiple neural network layers in series). Certain examples described herein make use of recurrent and fully-connected neural networks.

A "neural network layer", as typically defined within machine learning programming tools and libraries, may be considered an operation that maps input data to output data. A "neural network layer" may apply one or more parameters such as weights to map input data to output data. One or more bias terms may also be applied. The weights and biases of a neural network layer may be applied using one or more multidimensional arrays or matrices. In general, a neural network layer has a plurality of parameters whose value influence how input data is mapped to output data by the layer. These parameters may be trained in a supervised manner by optimizing an objective function. This typically involves minimizing a loss function. Certain parameters may also be pre-trained or fixed in another manner. Fixed parameters may be considered as configuration data that controls the operation of the neural network layer. A neural network layer or architecture may comprise a mixture of fixed and learnable parameters. A recurrent neural network layer may apply a series of operations to update a recurrent state and transform input data. The update of the recurrent state and the transformation of the input data may involve transformations of one or more of a previous recurrent state and the input data. A recurrent neural network layer may be trained by unrolling a modelled recurrent unit, as may be applied within machine learning programming tools and libraries. Although a recurrent neural network may be seen to comprise several (sub) layers to apply different gating operations, most machine learning programming tools and libraries refer to the application of the recurrent neural network as a whole as a "neural network layer" and this convention will be followed here. Lastly, a feed-forward neural network layer may apply one or more of a set of weights and biases to input data to generate output data. This operation may be represented as a matrix operation (e.g., where a bias term may be included by appending a value of 1 onto input data). Alternatively, a bias may be applied through a separate addition operation. As discussed above, the term "tensor" is used, as per machine learning libraries, to refer to an array that may have multiple dimensions, e.g. a tensor may comprise a vector, a matrix or a higher dimensionality data structure. In preferred example, described tensors may comprise vectors with a predefined number of elements.

To model complex non-linear functions, a neural network layer as described above may be followed by a non-linear activation function. Common activation functions include the sigmoid function, the tanh function, and Rectified Linear Units (RELUs). Many other activation functions exist and may be applied. An activation function may be selected based on testing and preference. Activation functions may be omitted in certain circumstances, and/or form part of the internal structure of a neural network layer.

The example neural network architectures described herein may be configured via training. In certain cases, "learnable" or "trainable" parameters may be trained using an approach called backpropagation. During backpropagation, the neural network layers that make up each neural network architecture are initialized (e.g., with randomized weights) and then used to make a prediction using a set of input data from a training set (e.g., a so-called "forward" pass). The prediction is used to evaluate a loss function. For example, a "ground-truth" output may be compared with a predicted output, and the difference may form part of the loss function. In certain examples, a loss function may be based on an absolute difference between a predicted scalar value and a binary ground truth label. The training set may comprise a set of transactions. If gradient descent methods are used, the loss function is used to determine a gradient of the loss function with respect to the parameters of the neural network architecture, where the gradient is then used to back propagate an update to the parameter values of the neural network architecture. Typically, the update is propagated according to the derivative of the weights of the neural network layers. For example, a gradient of the loss function with respect to the weights of the neural network layers may be determined and used to determine an update to the weights that minimizes the loss function. In this case, optimization techniques such as gradient descent, stochastic gradient descent, Adam etc. may be used to adjust the weights. The chain rule and auto-differentiation functions may be applied to efficiently compute the gradient of the loss function, working back through the neural network layers in turn.

Example Transaction Processing System

Figure 1A:
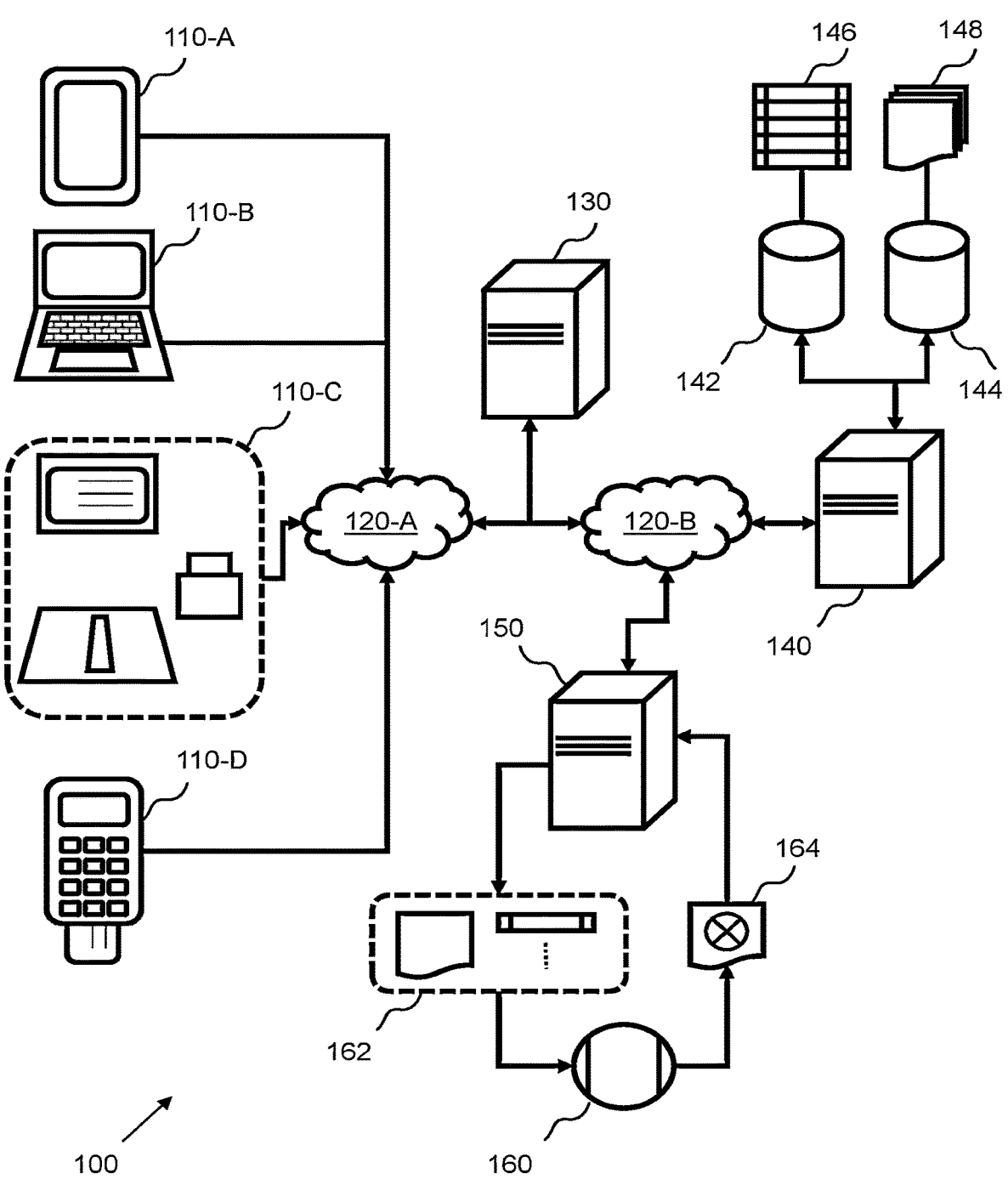
FIGS. 1A to 1C are schematic diagrams showing different example electronic infrastructures for transaction processing.
Figure 1B:
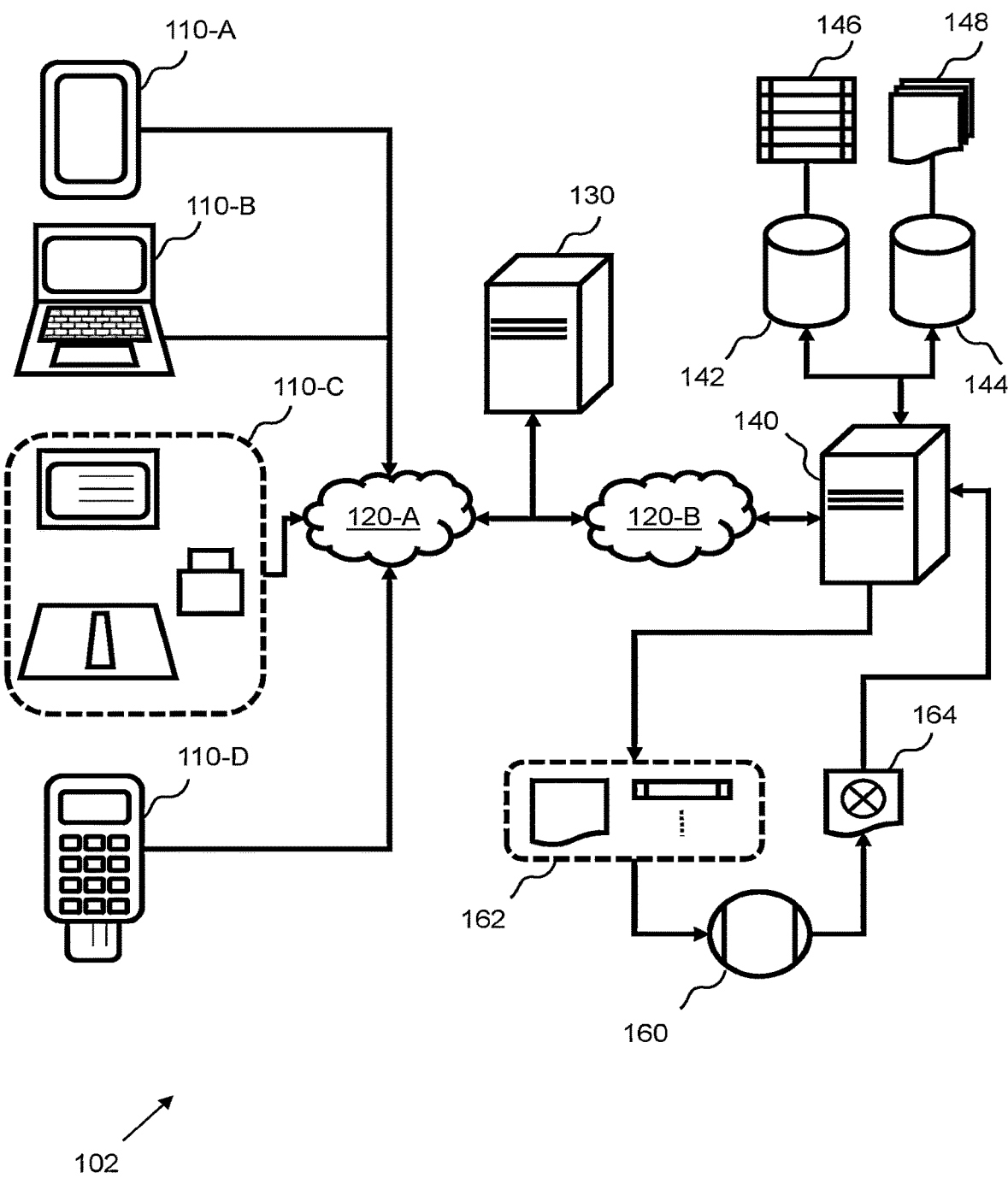
Figure 1C:
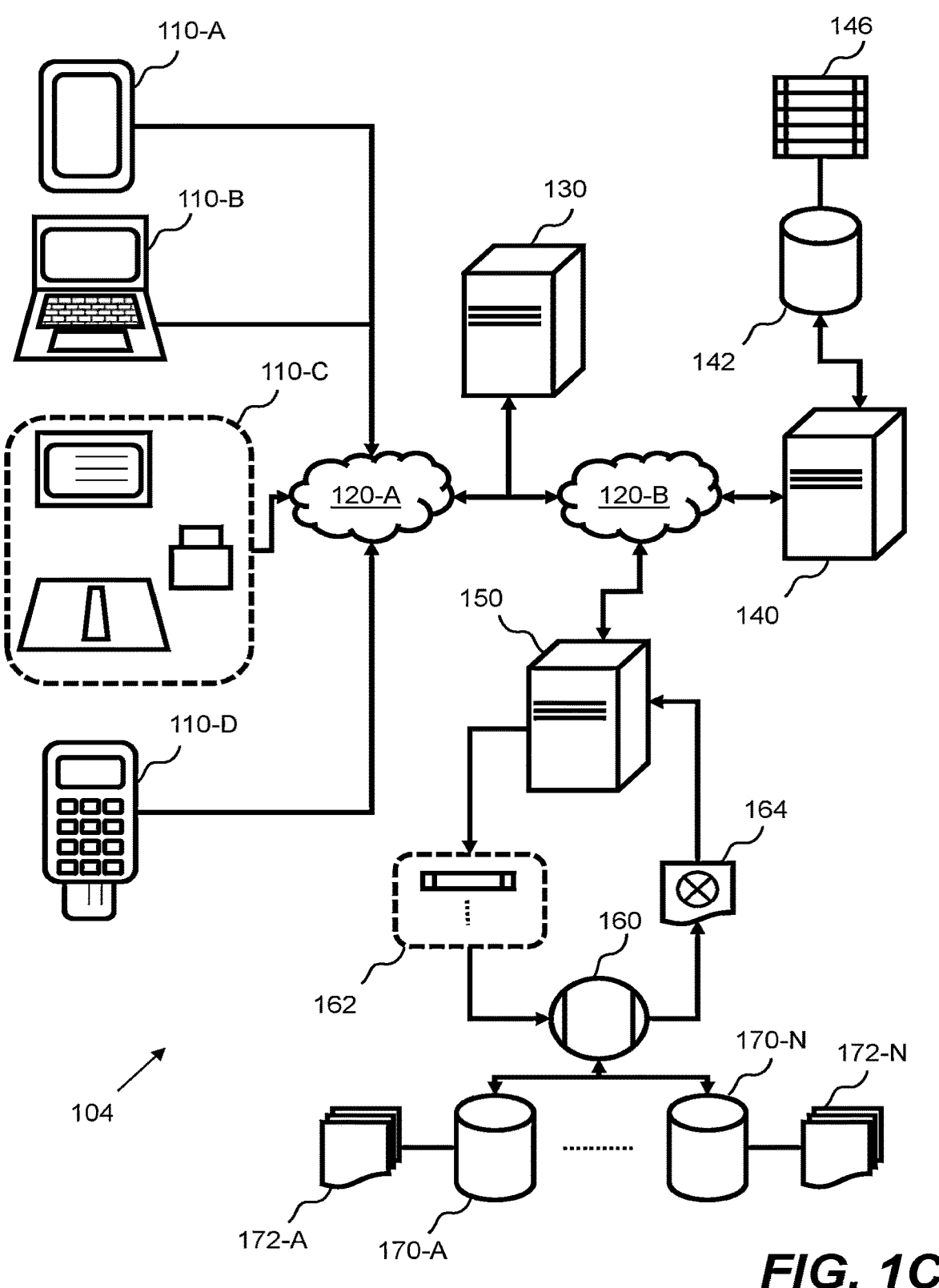

FIGS. 1A to 1C show a set of example transaction processing systems 100, 102, 104. These example transaction processing systems are described to provide context for the inventions discussed herein but should not be seen as limiting; the configuration of any one implementation may differ based on the specific requirements of that implementation. However, the described example transaction processing systems allow those skilled in the art to identify certain high-level technical features that are relevant for the description below. The three example transaction processing systems 100, 102, 104 show different areas where variation may occur.

FIGS. 1A to 1C show a set of client devices 110 that are configured to initiate a transaction. In this example, the set of client devices 110 comprise a smartphone 110-A, a computer 110-B, a point-of-sale (POS) system 110-C and a portable merchant device 110-D. These client devices 110 provide a set of non-exhaustive examples. Generally, any electronic device or set of devices may be used to undertake a transaction. In one case, the transaction comprises a purchase or payment. For example, the purchase or payment may be an online or mobile purchase or payment made by way of the smartphone 110-A or the computer 110-B, or may be a purchase or payment made at a merchant premises, such as via the POS system 110-C or the portable merchant device 110-D. The purchase or payment may be for goods and/or services.

In FIGS. 1A to 1C, the client devices 110 are communicatively coupled to one or more computer networks 120. The client devices 110 may be communicatively coupled in a variety of ways, including by one or more wired and/or wireless networks including telecommunications networks. In preferred examples, all communications across the one or more computer networks are secured, e.g. using Transport Layer Security (TLS) protocols. In FIG. 1A, two computer networks are shown 120-A and 120-B. These may be separate networks or different portions of a common network. The first computer network 120-A communicatively couples the client devices 110 to a merchant server 130. The merchant server 130 may execute a computer process that implements a process flow for the transaction. For example, the merchant server 130 may be a back-end server that handles transaction requests received from the POS system 110-C or the portable merchant device 110-D or may be used by an online merchant to implement a website where purchases may be made. It will be appreciated that the examples of FIGS. 1A to 1C are necessary simplifications of actual architectures; for example, there may be several interacting server devices that implement an online merchant, including separate server devices for providing HyperText Markup Language (HTML) pages detailing a product and/or service and for handling a payment process.

In FIG. 1A, the merchant server 130 is communicatively coupled to a further set of back-end server devices to process the transaction. In FIG. 1A, the merchant server 130 is communicatively coupled to a payment processor server 140 via a second network 120-B. The payment processor server 140 is communicatively coupled to a first data storage device 142 storing transaction data 146 and a second data storage device 144 storing ancillary data 148. The transaction data 146 may comprise batches of transaction data relating to different transactions that are undertaken over a period of time. The ancillary data 148 may comprise data associated with the transactions, such as records storing merchant and/or end user data. In FIG. 1A, the payment processor server 140 is communicatively coupled to a machine learning server 150 via the second network 120-B. The machine learning server 150 implements a machine learning system 160 for the processing of transaction data. The machine learning system 160 is arranged to receive input data 162 and to map this to output data 164 that is used by the payment processor server 140 to process a particular transaction, such as one arising from the client devices 110. In one case, the machine learning system 160 receives at least transaction data associated with the particular transaction and provides an alert or numeric output that is used by the payment processor server 140 to determine whether the transaction is to be authorised (i.e., approved) or declined. As such, the output of the machine learning system 160 may comprise a label, alert or other indication of fraud, or general malicious or anomalous activity. The output may comprise a probabilistic indication, such as a score or probability. In one case, the output data 164 may comprise a scalar numeric value. The input data 162 may further comprise data derived from one or more of the transaction data 146 and the ancillary data 148. In one case, the output data 164 indicates a level of deviation from a specific expected pattern of behaviour based on past observations or measurements. For example, this may indicate fraud or criminal behaviour as this often differs significantly from observed patterns of behaviour, especially on a large scale. The output data 164 may form a behavioural measure. The expected pattern of behaviour may be defined, either explicitly or implicitly, based on observed interactions between different entities within the transaction process flow, such as end users or customers, merchants (including point-of-sale and back-end locations or entities where these may differ), and banks.

The machine learning system 160 may be implemented as part of a transaction processing pipeline. An example transaction processing pipeline is described later with respect to FIGS. 5A and 5B. A transaction processing pipeline may comprise electronic communications between the client devices 110, merchant server 130, payment processor server 140 and machine learning server 150. Other server devices may also be involved, such as banking servers that provide authorisation from an issuing bank. In certain cases, client devices 110 may directly communicate with the payment processor server 140. In use, a transaction processing pipeline typically needs to be completed within one or two hundred milliseconds. In general, sub-second processing times may be deemed real-time (e.g., human beings typically perceive events on a timespan of 400 ms). Furthermore, 100-200 ms may be the desired maximum latency of the full round-trip-time for transaction processing; within this timespan, the time allotted for the machine learning system 160 may be a small fraction of this full amount, such as 10 ms (i.e., less that 5-10% of the target processing time), as most of the time may be reserved for other operations in the transaction processing flow. This presents a technical constraint for the implementation of the machine learning system 160. Furthermore, in real-world implementations, average processing volumes may be on the order of 1000-2000 a second. This means that most "off-the-shelf" machine learning systems are not suitable to implement machine learning system 160. It further means that most machine learning approaches described in academic papers cannot be implemented within the aforementioned transaction processing pipeline without non-obvious adaptations. There is also a problem that anomalies are, by their very nature, rare events and so accurate machine learning systems are difficult to train.

FIG. 1B shows a variation 102 of the example transaction processing system 100 of FIG. 1A. In this variation 102, the machine learning system 160 is implemented within the payment processor computer infrastructure. e.g. executed by the payment processor server 140 and/or executed on a locally coupled server within the same local network as the payment processor server 140. The variation 102 of FIG. 1B may be preferred for larger payment processors as it allows faster response times, greater control, and improved security. However, functionally, the transaction processing pipeline may be similar to that of FIG. 1A. For example, in the example of FIG. 1A, the machine learning system 160 may be initiated by a secure external application programming interface (API) call, such as a Representation State Transfer (REST) API call using Hypertext Transfer Protocol Secure (HTTPS), while in FIG. 1B, the machine learning system 160 may be initiated by an internal API call, but where a common end API may handle both requests (e.g., the REST HTTPS API may provide an external wrapper for the internal API).

FIG. 1C shows another variation 104 of the example transaction processing system 100 of FIG. 1A. In this variation 104, the machine learning system 160 is communicatively coupled to local data storage devices 170. For example, data storage devices 170 may be on the same local network as machine learning server 150 or may comprise a local storage network accessible to the machine learning server 150. In this case, there are a plurality of local data storage devices 170-A to 170-N, where each data storage device stores partitioned ancillary data 172. The partitioned ancillary data 172 may comprise parameters for one or more machine learning models. In one case, the ancillary data 172 may comprise a state for machine learning models, where the state may relate to a specific entity such as a user or merchant. The partitioning of the ancillary data 172 may need to be applied to meet security requirements set by a third party, such as the payment processor, one or more banks and/or one or more merchants. In use, the machine learning system 160 accesses the ancillary data 172-A to 172-N via the plurality of local data storage devices 170-A to 170-N based on the input data 162. For example, the input data 162 may be received by way of an API request from a particular source and/or may comprise data that identifies that a particular partition is to be used to handle the API request. More details of different storage systems that may be applied to meet security requirements are set out in FIGS. 2A and 2B.

Example Data Storage Configurations

Figures 2A, 2B:
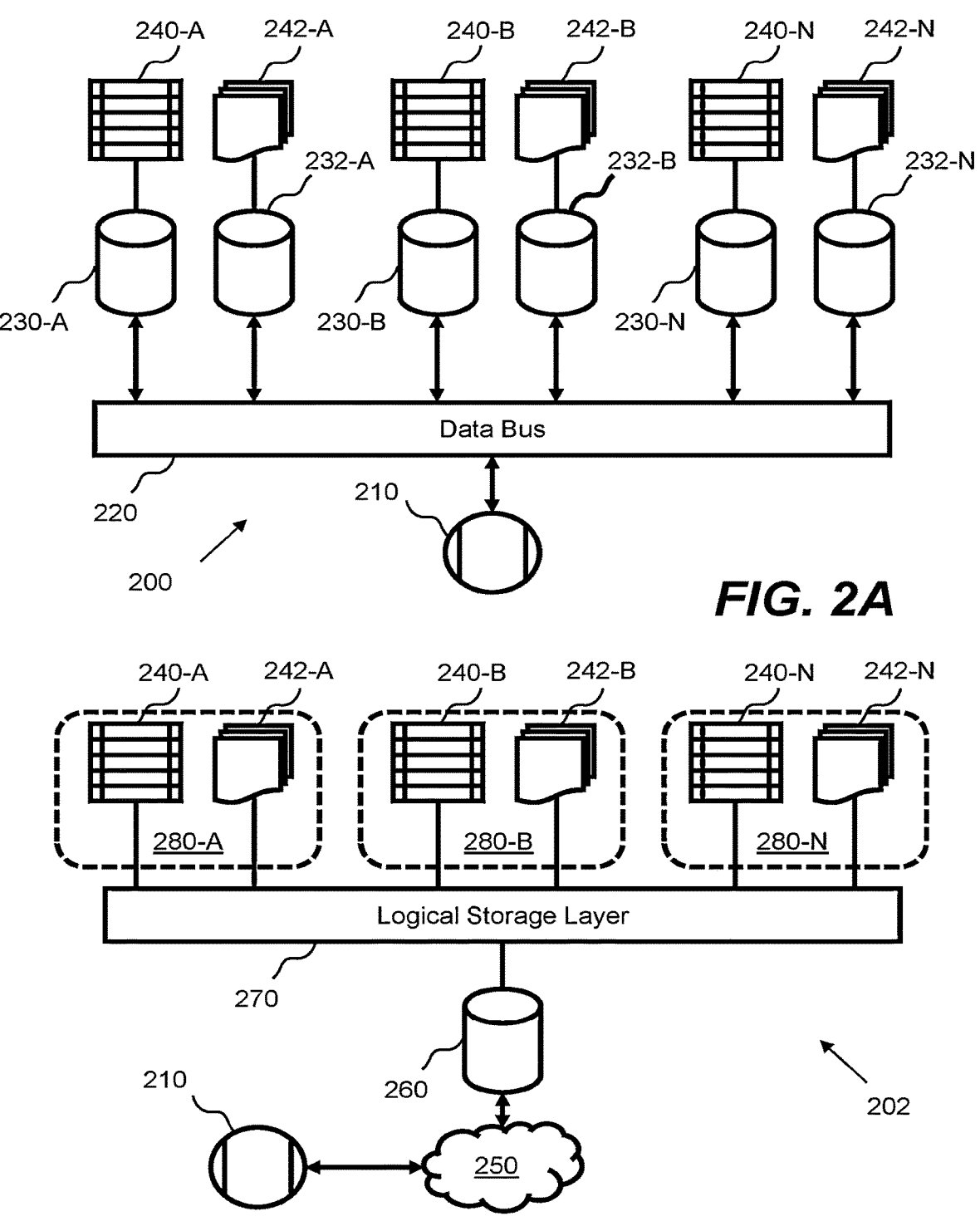
FIGS. 2A and 2B are schematic diagrams showing different examples of data storage systems for use by a machine learning transaction processing system.

FIGS. 2A and 2B show two example data storage configurations 200 and 202 that may be used by an example machine learning system 210 for the processing of transaction data. The examples of FIGS. 2A and 2B are two non-limiting examples that show different options available for implementations, and particular configurations may be selected according to individual circumstances. The machine learning system 210 may comprise an implementation of the machine learning system 160 described in the previous examples of FIGS. 1A to 1C. The examples of FIGS. 2A and 2B allow for the processing of transaction data that is secured using heterogeneous cryptographic parameters, e.g. for the machine learning system 210 to securely process transaction data for heterogeneous entities. It will be appreciated that the configurations of FIGS. 2A and 2B may not be used if the machine learning system 160 is implemented for a single set of secure transaction and ancillary data, e.g. within an internal transaction processing system or as a hosted system for use by a single payment processor.

FIG. 2A shows a machine learning system 210 communicatively coupled to a data bus 220. The data bus 220 may comprise an internal data bus of the machine learning server 150 or may form part of storage area network. The data bus 220 communicatively couples the machine learning system 210 to a plurality of data storage devices 230, 232. The data storage devices 230, 232 may comprise any known data storage device such as magnetic hard disks and solid-state devices. Although data storage devices 230, 232 are shown as different devices in FIG. 2A they may alternatively form different physical areas or portions of storage within a common data storage device. In FIG. 2A, the plurality of data storage devices 230, 232 store historical transaction data 240 and ancillary data 242. In FIG. 2A, a first set of data storage devices 230 store historical transaction data 240 and a second set of data storage devices 232 store ancillary data 242. Ancillary data 242 may comprise one or more of model parameters for a set of machine learning models (such as trained parameters for a neural network architecture and/or configuration parameters for a random forest model) and state data for those models. In one case, the different sets of historical transaction data 240-A to N and ancillary data 242-A to N are associated with different entities that are securely and collectively use services provided by the machine learning system 210, e.g. these may represent data for different banks that need to be kept separate as part of the conditions of providing machine learning services to those entities.

FIG. 2B shows another way different sets of historical transaction data 240-A to N and ancillary data 242-A to N may be stored. In FIG. 2B the machine learning system 210 is communicatively coupled, via data transfer channel 250, to at least one data storage device 260. The data transfer channel 250 may comprise a local storage bus, local storage area network, and/or remote secure storage coupling (e.g., as overlaid over insecure networks such as the Internet). In FIG. 2B, a secure logical storage layer 270 is provided using the physical data storage device 260. The secure logical storage layer 270 may be a virtualized system that appears as separate physical storage devices to the machine learning system 210 while actually being implemented independently upon the at least one data storage device 260. The logical storage layer 270 may provide separate encrypted partitions 280 for data relating to groups of entities (e.g., relating to different issuing banks etc.) and the different sets of historical transaction data 240-A to N and ancillary data 242-A to N may be stored in the corresponding partitions 280-A to N. In certain cases, entities may be dynamically created as transactions are received for processing based on data stored by one or more of the server systems shown in FIGS. 1A to 1C.

Example Transaction Data

Figure 3A:
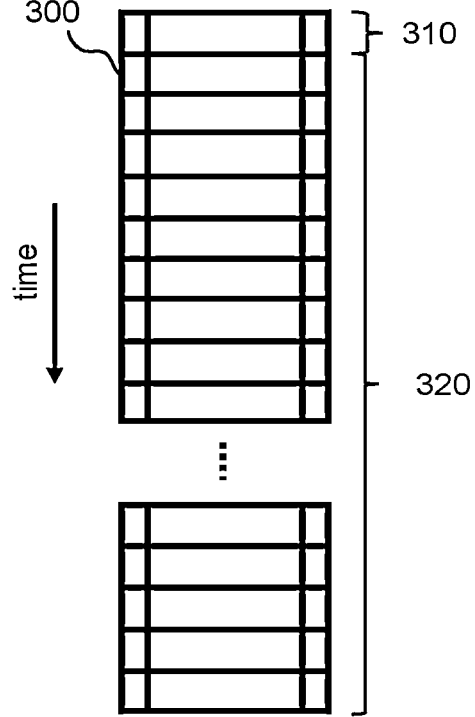
FIGS. 3A and 3B are schematic diagrams showing different examples of transaction data.
Figure 3B:
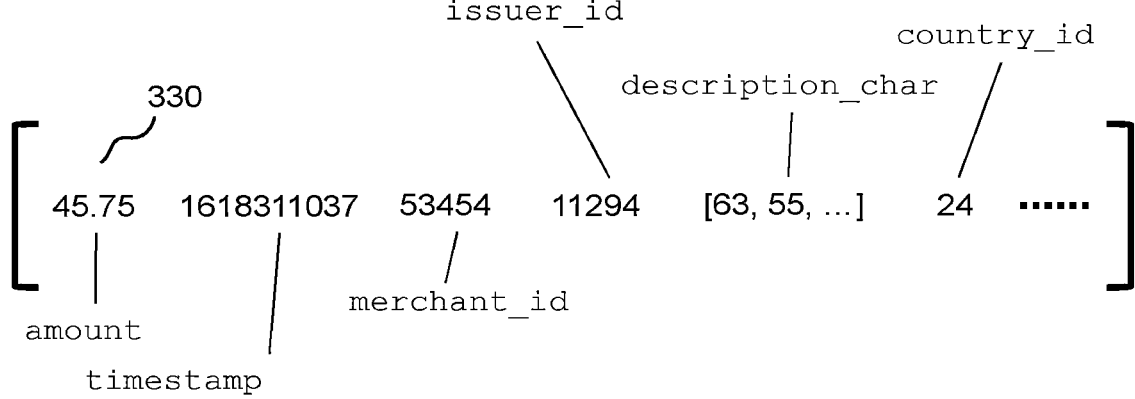

FIGS. 3A and 3B show examples of transaction data that may be processed by a machine learning system such as 160 or 210. FIG. 3A shows how transaction data may comprise a set of time-ordered records 300, where each record has a timestamp and comprises a plurality of transaction fields. In certain cases, transaction data may be grouped and/or filtered based on the timestamp. For example, FIG. 3A shows a partition of transaction data into current transaction data 310 that is associated with a current transaction and "older" or historical transaction data 320 that is within a predefined time range of the current transaction. The time range may be set as a hyperparameter of any machine learning system. Alternatively, the "older" or historical transaction data 320 may be set as a certain number of transactions. Mixtures of the two approaches are also possible.

FIG. 3B shows how transaction data 330 for a particular transaction may be stored in numeric form for processing by one or more machine learning models. For example, in FIG. 3B, transaction data has at least fields: transaction amount, timestamp (e.g., as a Unix epoch), transaction type (e.g., card payment or direct debit), product description or identifier (i.e., relating to items being purchased), merchant identifier, issuing bank identifier, a set of characters (e.g., Unicode characters within a field of predefined character length), country identifier etc. It should be noted that a wide variety of data types and formats may be received and pre-processed into appropriate numerical representations. In certain cases, originating transaction data, such as that generated by a client device and sent to merchant server 130 is pre-processed to convert alphanumeric data types to numeric data types for the application of the one or more machine learning models. Other fields present in the transaction data can include, but are not limited to, an account number (e.g., a credit card number), a location of where the transaction is occurring, and a manner (e.g., in person, over the phone, on a website) in which the transaction is executed.

Example Machine Learning System

Figure 4:
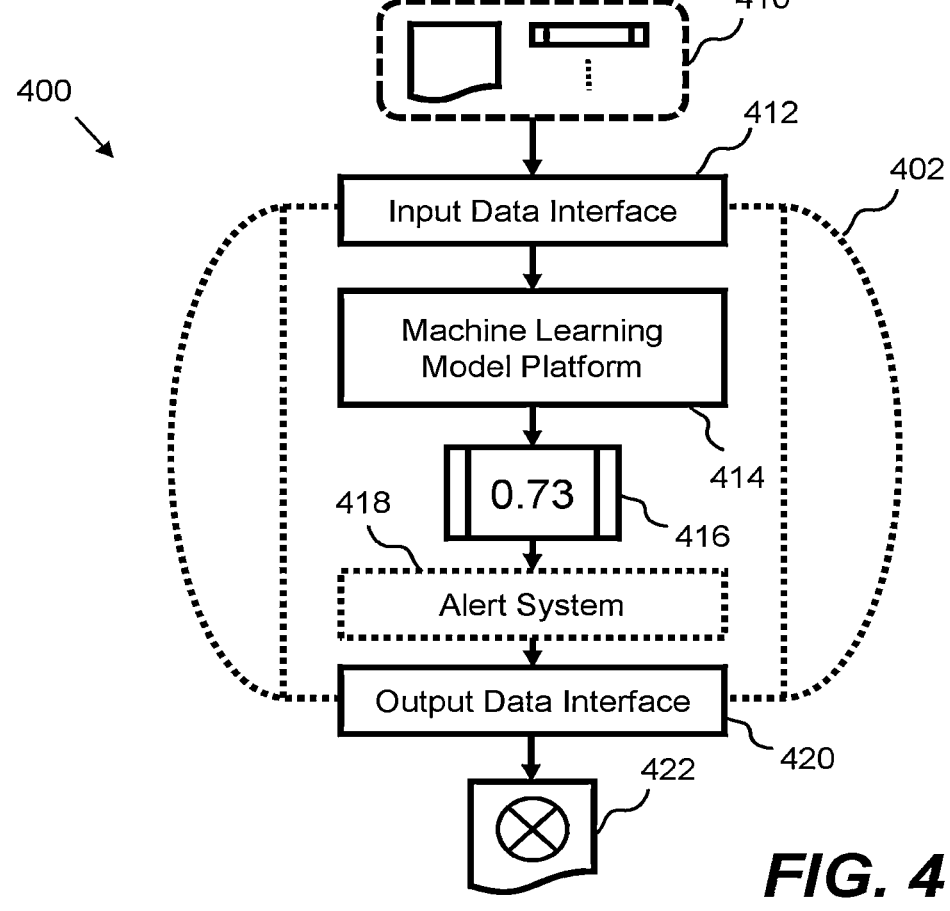
FIG. 4 is a schematic diagram showing example components of a machine learning transaction processing system.

FIG. 4 shows one example 400 of a machine learning system 402 that may be used to process transaction data. Machine learning system 402 may implement one or more of machine learning systems 160 and 210. The machine learning system 402 receives input data 410. The form of the input data 410 may depend on which machine learning model is being applied by the machine learning system 402. In a case where the machine learning system 402 is configured to perform fraud or anomaly detection in relation to a transaction, e.g. a transaction in progress as described above, the input data 410 may comprise transaction data such as 330 (i.e., data forming part of a data package for the transaction) as well as data derived from historical transaction data (such as 300 in FIG. 3A) and/or data derived from ancillary data (such as 148 in FIGS. 1A to 1C or 242 in FIGS. 2A and 2B). The ancillary data may comprise secondary data linked to one or more entities identified in the primary data associated with the transaction. For example, if transaction data for a transaction in progress identifies a user, merchant and one or more banks associated with the transaction (such as an issuing bank for the user and a merchant bank), such as via unique identifiers present in the transaction data, then the ancillary data may comprise data relating to these transaction entities. The ancillary data may also comprise data derived from records of activity, such as interaction logs and/or authentication records. In one case, the ancillary data is stored in one or more static data records and is retrieved from these records based on the received transaction data. Additionally, or alternatively, the ancillary data may comprise machine learning model parameters that are retrieved based on the contents of the transaction data. For example, machine learning models may have parameters that are specific to one or more of the user, merchant and issuing bank, and these parameters may be retrieved based on which of these is identified in the transaction data. For example, one or more of users, merchants, and issuing banks may have corresponding embeddings, which may comprise retrievable or mappable tensor representations for said entities. For example, each user or merchant may have a tensor representation (e.g., a floating-point vector of size 128-1024) that may either be retrieved from a database or other data storage or may be generated by an embedding layer, e.g. based on a user or merchant index.

The input data 410 is received at an input data interface 412. The input data interface 412 may comprise an API interface, such as an internal or external API interface as described above. In one case, the payment processor server 140 as shown in FIGS. 1A to 1C makes a request to this interface, where the request payload contains the transaction data. The API interface may be defined to be agnostic as to the form of the transaction data or its source. The input data interface 412 is communicatively coupled to a machine learning model platform 414. In one case, a request made to the input data interface 412 triggers the execution of the machine learning model platform 414 using the transaction data supplied to the interface. The machine learning model platform 414 is configured as an execution environment for the application of one or more machine learning models to the input data 410. In one case, the machine learning model platform 414 is arranged as an execution wrapper for a plurality of different selectable machine learning models.

For example, a machine learning model may be defined using a model definition language (e.g., similar to, or using, markup languages such as eXtended Markup Language—XML). Model definition languages may include (amongst others, independently or in combination), SQL, TensorFlow, Caffe, Thinc and PyTorch. In one case, the model definition language comprises computer program code that is executable to implement one or more of training and inference of a defined machine learning model. The machine learning models may, for example, comprise, amongst others, artificial neural network architectures, ensemble models, regression models, decision trees such as random forests, graph models, and Bayesian networks. One example machine learning model based on an artificial neural network is described later with reference to FIGS. 6A to 6C and one example machine learning model based on a random forest model is described later with reference to FIG. 7. The machine learning model platform 414 may define common (i.e., shared) input and output definitions such that different machine learning models are applied in a common (i.e., shared) manner.

In the present example, the machine learning model platform 414 is configured to provide at least a single scalar output 416. This may be normalised within a predefined range, such as 0 to 1. When normalised, the scalar output 416 may be seen as a probability that a transaction associated with the input data 410 is fraudulent or anomalous. In this case, a value of "0" may represent a transaction that matches normal patterns of activity for one or more of a user, merchant and issuing bank, whereas a value of "1" may indicate that the transaction is fraudulent or anomalous, i.e. does not match expected patterns of activity (although those skilled in the art will be aware that the normalised range may differ, such as be inverted or within different bounds, and have the same functional effect). It should be noted that although a range of values may be defined as 0 to 1, output values may not be uniformly distributed within this range, for example, a value of "0.2" may be a common output for a "normal" event and a value of "0.8" may be seen as being over a threshold for a typical "anomalous" or fraudulent event. The machine learning model implemented by the machine learning platform 414 may thus implement a form of mapping between high-dimensionality input data (e.g., the transaction data and any retrieve ancillary data) and a single value output. In one case, for example, the machine learning platform 414 may be configured to receive input data for the machine learning model in a numeric format, wherein each defined machine learning model is configured to map input data defined in the same manner. The exact machine learning model that is applied by the machine learning model platform 414, and the parameters for that model, may be determined based on configuration data. The configuration data may be contained within, and/or identified using, the input data 410 and/or may be set based on one or more configuration files that are parsed by the machine learning platform 414.

In certain cases, the machine learning model platform 414 may provide additional outputs depending on the context. In certain implementations, the machine learning model platform 414 may be configured to return a "reason code" capturing a human-friendly explanation of a machine learning model's output in terms of suspicious input attributes. For example, the machine learning model platform 414 may indicate which of one or more input elements or units within an input representation influenced the model output, e.g. a combination of an "amount" channel being above a learnt threshold and a set of "merchant" elements or units (such as an embedding or index) being outside a given cluster. In cases, where the machine learning model platform 414 implements a decision tree, these additional outputs may comprise a route through the decision tree or an aggregate feature importance based on an ensemble of trees. For neural network architectures, this may comprise layer output activations and/or layer filters with positive activations.

In FIG. 4, certain implementations may comprise an optional alert system 418 that receives the scalar output 416. In other implementations, the scalar output 416 may be passed directly to an output data interface 420 without post processing. In this latter case, the scalar output 416 may be packaged into a response to an original request to the input data interface 412. In both cases, output data 422 derived from the scalar output 416 is provided as an output of the machine learning system 402. The output data 422 is returned to allow final processing of the transaction data. For example, the output data 422 may be returned to the payment processor server 140 and used as the basis of a decision to approve or decline the transaction. Depending on implementation requirements, in one case, the alert system 418 may process the scalar output 416 to return a binary value indicating whether the transaction should be approved or declined (e.g., "1" equals decline). In certain cases, a decision may be made by applying a threshold to the scalar output 416. This threshold may be context dependent. In certain cases, the alert system 418 and/or the output data interface 420 may also receive additional inputs, such as explanation data (e.g., the "reason code" discussed above) and/or the original input data. The output data interface 420 may generate an output data package for output data 422 that combines these inputs with the scalar output 416 (e.g., at least for logging and/or later review). Similar, an alert generated by the alert system 418 may include and/or be additionally based on the aforementioned additional inputs, e.g. in addition to the scalar output 416.

In a preferred implementation, the machine learning system 402 is used in an "online" mode to process a high volume of transactions within a narrowly defined time range. For example, in normal processing conditions the machine learning system 402 may process requests within 7-12 ms and be able to manage 1000-2000 requests a second (these being median constraints from real-world operating conditions). However, the machine learning system 402 may also be used in an "offline" mode, e.g. by providing a selected historical transaction to the input data interface 412. In an offline mode, input data may be passed to the input data interfaces in batches (i.e., groups). The machine learning system 402 may also be able to implement machine learning models that provide a scalar output for an entity as well as, or instead of, a transaction. For example, the machine learning system 402 may receive a request associated with an identified user (e.g., a card or payment account holder) or an identified merchant and be arranged to provide a scalar output 416 indicating a likelihood that the user or merchant is fraudulent, malicious, or anomalous (i.e., a general threat or risk). For example, this may form part of a continuous or periodic monitoring process, or a one-off request (e.g., as part of an application for a service). The provision of a scalar output for a particular entity may be based on a set of transaction data up to and including a last approved transaction within a sequence of transaction data (e.g., transaction data for an entity similar to that should in FIG. 3A).

Example Transaction Process Flow

Figure 5A:
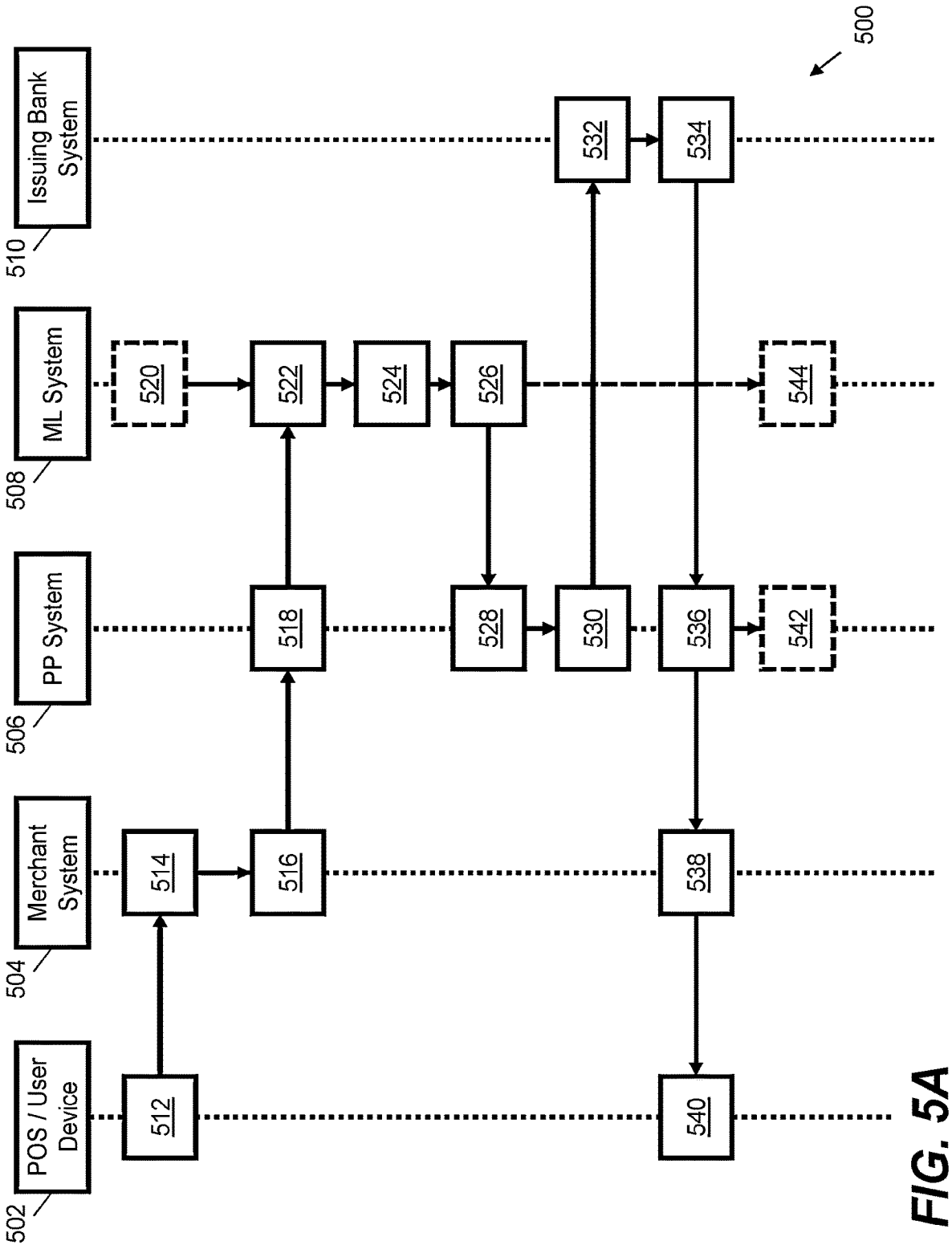
FIGS. 5A and 5B are sequence diagrams showing an example set of processes performed by different computing entities on transaction data.
Figure 5B:
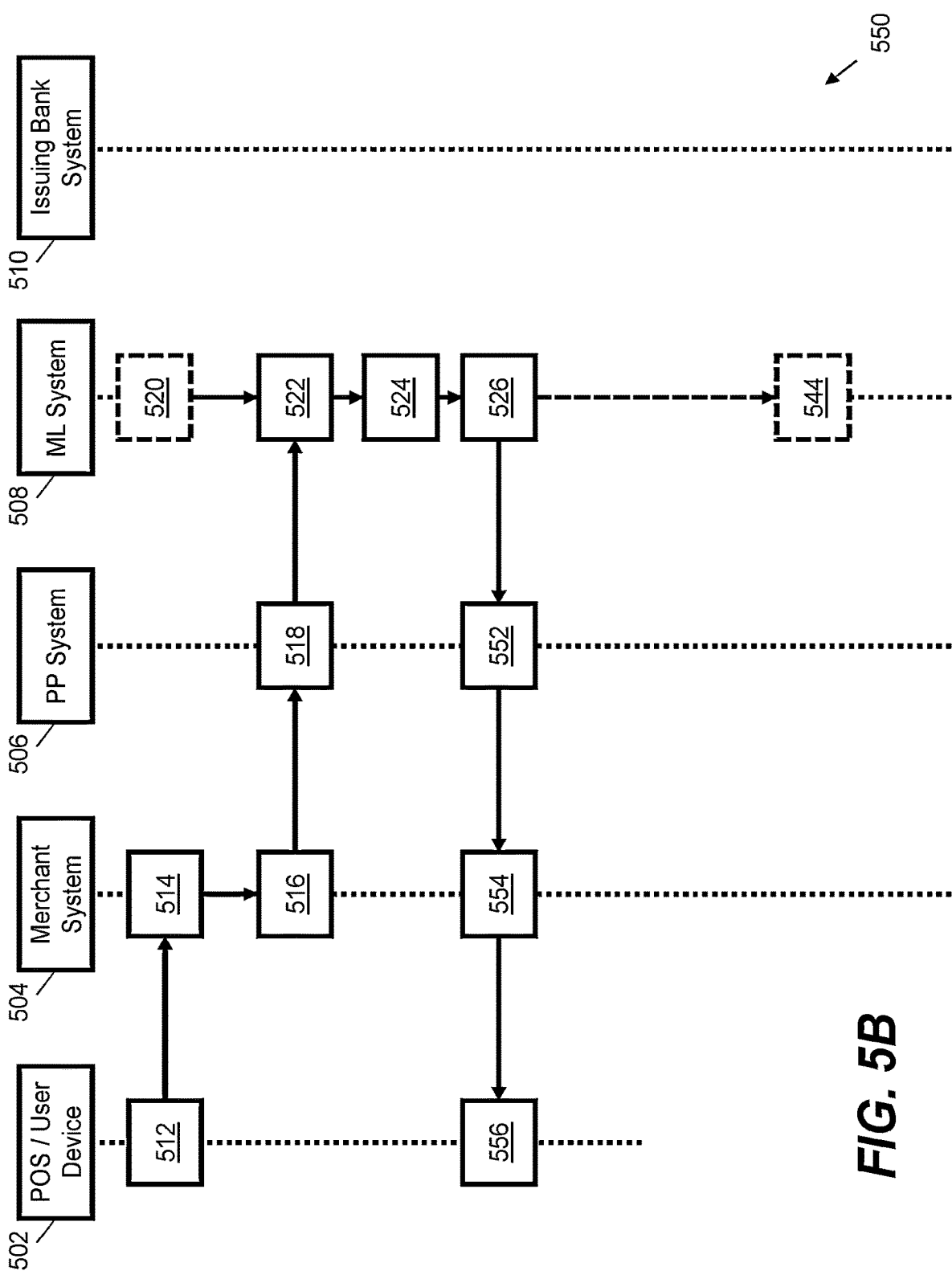

FIGS. 5A and 5B show two possible example transaction process flows 500 and 550. These process flows may take place in the context of the example transaction process systems 100, 102, 104 shown in FIGS. 1A to 1C as well as other systems. The process flows 500 and 550 are provided as one example of a context in which a machine learning transaction processing system may be applied, however not all transaction process flows will necessarily follow the processes shown in FIGS. 5A and 5B and process flows may change between implementations, systems and over time. The example transaction process flows 500 and 550 reflect two possible cases: a first case represented by transaction process flow 500 where a transaction is approved, and a second case represented by transaction process flow 550 where a transaction is declined. Each transaction process flow 500, 550 involves the same set of five interacting systems and devices: a POS or user device 502, a merchant system 504, a payment processor (PP) system 506, a machine learning (ML) system 508 and an issuing bank system 510. The POS or user device 502 may comprise one of the client devices 110, the merchant system 504 may comprise the merchant server 130, the payment processor system 506 may comprise the payment processor server 140, and the machine learning system 508 may comprise an implementation of the machine learning system 160, 210 and/or 402. The issuing bank system 510 may comprise one or more server devices implementing transaction functions on behalf of an issuing bank. The five interacting systems and devices 502 to 510 may be communicatively coupled by one or more internal or external communication channels, such as networks 120. In certain cases, certain ones of these systems may be combined, e.g. an issuing bank may also act as a payment processor and so systems 506 and 510 may be implemented with a common system. In other cases, a similar process flow may be performed specifically for a merchant (e.g., without involving a payment processor or issuing bank). In this case, the machine learning system 508 may communicate directly with the merchant system 504. In these variations, a general functional transaction process flow may remain similar to that described below.

The transaction process flow in both FIGS. 5A and 5B comprises a number of common (i.e., shared) processes 512 to 528. At block 512, the POS or user device 502 initiates a transaction. For a POS device, this may comprise a cashier using a front-end device to attempt to take an electronic payment; for a user device 502 this may comprise a user making an online purchase (e.g., clicking "complete" within an online basket) using a credit or debit card, or an online payment account. At block 514, the payment details are received as electronic data by the merchant system 504. At block 516, the transaction is processed by the merchant system 504 and a request is made to the payment processor system 506 to authorise the payment. At block 518, the payment processor system 506 receives the request from the merchant system 504. The request may be made over a proprietary communications channel or as a secure request over public networks (e.g., an HTTPS request over the Internet). The payment processor system 506 then makes a request to the machine learning system 508 for a score or probability for use in processing the transaction. Block 518 may additional comprise retrieving ancillary data to combine with the transaction data that is sent as part of the request to the machine learning system 508. In other cases, the machine learning system 508 may have access to data storage devices that store ancillary data (e.g., similar to the configurations of FIGS. 2A and 2B) and so retrieve this data as part of internal operations (e.g., based on identifiers provided within the transaction data and/or as defined as part of an implemented machine learning model).

Block 520 shows a model initialisation operation that occurs prior to any requests from the payment processor system 506. For example, the model initialisation operation may comprise loading a defined machine learning model and parameters that instantiate the defined machine learning model. At block 522, the machine learning system 508 receives the request from the payment processor system 506 (e.g., via a data input interface such as 412 in FIG. 4). At block 522, the machine learning system 508 may perform any defined pre-processing prior to application of the machine learning model initialised at block 520. For example, in the case that the transaction data still retains character data, such as a merchant identified by a character string or a character transaction description, this may be converted into suitable structured numeric data (e.g., by converting string categorical data to an identifier via a look-up operation or other mapping, and/or by mapping characters or groups of characters to vector embeddings). Then at block 524 the machine learning system 506 applies the instantiated machine learning model, supplying the model with input data derived from the received request. This may comprise applying the machine learning model platform 414 as described with reference to FIG. 4. At block 526, a scalar output is generated by the instantiated machine learning model. This may be processed to determine an "approve" or "decline" binary decision at the machine learning system 508 or, in a preferred case, is returned to the payment processor system 506 as a response to the request made at block 518.

At block 528, the output of the machine learning system 508 is received by the payment processor system 506 and is used to approve or decline the transaction. FIG. 5A shows a process where the transaction is approved based on the output of the machine learning system 508; FIG. 5B shows a process where the transaction is declined based on the output of the machine learning system 508. In FIG. 5A, at block 528, the transaction is approved. Then at block 530, a request is made to the issuing bank system 532. At block 534, the issuing bank system 532 approves or declines the request. For example, the issuing bank system 532 may approve the request if an end user or card holder has sufficient funds and approval to cover the transaction cost. In certain cases, the issuing bank system 532 may apply a second level of security; however, this may not be required if the issuing bank relies on the anomaly detection performed by the payment processor using the machine learning system 508. At block 536, the authorisation from the issuing bank system 510 is returned to the payment processor system 506, which in turn sends a response to the merchant system 504 at block 538, and the merchant system 504 in turn responds to the POS or user device 502 at block 540. If the issuing bank system 510 approves the transaction at block 534, then the transaction may be completed, and a positive response returned via the merchant system 504 to the POS or user device 502. The end user may experience this as an "authorised" message on screen of the POS or user device 502. The merchant system 504 may then complete the purchase (e.g., initiate internal processing to fulfil the purchase).

At a later point in time, one or more of the merchant system 504 and the machine learning system 508 may save data relating to the transaction, e.g. as part of transaction data 146, 240 or 300 in the previous examples. This is shown at dashed blocks 542 and 544. The transaction data may be saved along with one or more of the output of the machine learning system 508 (e.g., the scalar fraud or anomaly probability) and a final result of the transaction (e.g., whether it was approved or declined). The saved data may be stored for use as training data for the machine learning models implemented by the machine learning system 508 (e.g., as the base for the training data shown in one or more of FIGS. 8 and 10). The saved data may also be accessed as part of future iterations of block 524, e.g. may form part of future ancillary data. In certain cases, a final result or outcome of the transaction may not be known at the time of the transaction. For example, a transaction may only be labelled as anomalous via later review by an analyst and/or automated system, or based on feedback from a user (e.g., when the user reports fraud or indicates that a payment card or account was compromised from a certain date). In these cases, ground truth labels for the purposes of training the machine learning system 508 may be collected over time following the transaction itself.

Turning now to the alternative process flow of FIG. 5B, in this case one or more of the machine learning system 508 and the payment processor system 506 declines the transaction based on the output of the machine learning system 508. For example, a transaction may be declined if the scalar output of the machine learning system 508 is above a retrieved threshold. At block 552, the payment processor system 506 issues a response to the merchant system 504, which is received at block 554. At block 554, the merchant system 504 undertakes steps to prevent the transaction from completing and returns an appropriate response to the POS or user device 502. This response is received at block 556 and an end user or customer may be informed that their payment has been declined, e.g. via a "Declined" message on screen. The end user or customer may be prompted to use a different payment method. Although not shown in FIG. 5B, in certain cases, the issuing bank system 510 may be informed that a transaction relating to a particular account holder has been declined. The issuing bank system 510 may be informed as part of the process shown in FIG. 5B or may be informed as part of a periodic (e.g., daily) update. Although, the transaction may not become part of transaction data 146, 240 or 300 (as it was not approved), it may still be logged by at least the machine learning system 508 as indicated by block 544. For example, as for FIG. 5A, the transaction data may be saved along with the output of the machine learning system 508 (e.g., the scalar fraud or anomaly probability) and a final result of the transaction (e.g., that it was declined).

First Example Configuration for a Machine Learning System

Certain examples described herein, such as the machine learning systems 160, 210, 402, and 508 in FIGS. 1A to 1C, 2A and 2B, FIG. 4 and FIGS. 5A and 5B, may be implemented as a modular platform that allow for different machine learning models and configurations to be used to provide for the transaction processing described herein. This modular platform may allow for different machine learning models and configurations to be used as technologies improve and/or based on particular characteristics of the data available. In this document, two example configurations of a machine learning system are provided: a first is shown in FIGS. 6A to 6C and a second is shown in FIG. 7. These may be used independently and separately. The first configuration of FIGS. 6A to 6C shows a neural network architecture and the second configuration of FIG. 7 shows a random forest implementation.

FIG. 6A shows a first example configuration for a machine learning system 600. In FIG. 6A, the machine learning system 600 receives input data 601 and maps this to a scalar output 602. This general processing follows the same framework as described with reference to the previous examples. The machine learning system 600 comprises a first processing stage 603 and a second processing stage 604. The first processing stage 603 is shown in more detail in FIG. 6B, and the second processing stage 604 is shown in more detail in FIG. 6C. The machine learning system 600 is applied to data associated with at least a proposed transaction to generate a scalar output 602 for the proposed transaction. The scalar output 602 represents a likelihood that the proposed transaction presents a behavioural anomaly, e.g. that the proposed transaction embodies a pattern of actions or events that differs from expected or typical patterns of actions or events. In certain cases, the scalar output 602 represents a probability that the proposed transaction presents an anomaly in a sequence of actions, where the actions include at least previous transactions and may also include other interactions between an entity and one or more computer systems. The scalar output 602 may be used to complete an approval decision for the proposed transaction, e.g. as described with reference to FIGS. 5A and 5B, may be used to decide whether to approve or decline the proposed transaction.

In FIG. 6A, the input data 601 comprises transaction time data 606 and transaction feature data 608. The transaction time data 606 may comprise data derived from a timestamp such as that shown in FIG. 3B or any other data format representing a date and/or time of a transaction. The date and/or time of the transaction may be set as a time the transaction was initiated at a client computing device such as 110 or 502 or may be set as a time a request was received at the machine learning system 600, e.g. similar to the time of a request as received at block 522 in FIGS. 5A and 5B. In one case, as shown later with reference to FIG. 6C, the transaction time data 606 may comprise time data for a plurality of transactions, such as the current proposed transaction and a historical set of one or more prior transactions. The time data for the historical set of one or more prior transactions may be received with a request and/or retrieved from a storage device communicatively coupled to the machine learning system 600. In the present example, the transaction time data 606 is converted into relative time data for the application of one or more neural network architectures. In particular, the transaction time data 606 is converted into a set of time difference values, where the time difference values represent a time difference between the current proposed transaction and each one of one or more prior transactions. For example, the time difference may comprise a normalised time difference in seconds, minutes or hours. The time difference values may be computed by subtracting one or more timestamps of prior transactions from the timestamp for the proposed transaction. The time difference values may be normalised by dividing by a maximum predefined time difference and/or clipped at a maximum time difference value. In one case, the one or more prior transactions may be selected from a predefined time range (e.g., set 320 in FIG. 3A) and/or a predefined number of transactions. This predefined time range and/or a maximum time difference of the predefined number of transactions may be used to normalise the time difference values.

In an inference mode, the machine learning system 600 detects sets of features from the input data 601 using the first and second processing stages 603, 604. Output data from both the first and second processing stages 603, 604 is then used to compute the scalar value 602. In FIG. 6A, the machine learning system 600 comprises a first multilayer perceptron 610. The first multilayer perceptron comprises a fully-connected neural network architecture comprising a plurality of neural network layers (e.g., 1 to 10 layers) to pre-process the data for the proposed transaction prior to at least the first processing stage 603. Although a multilayer perceptron is described here, in certain implementations the pre-processing may be omitted (e.g., if the received transaction data 608 is already in a suitable format) and/or only a single layer of linear mapping may be provided. In certain examples, the pre-processing may be seen as a form of "embedding" or "initial mapping" layer for the input transaction data. In certain cases, one or more of the neural network layers of the first multilayer perceptron 610 may provide learnt scaling and/or normalisation of the received transaction data 608. In general, the fully-connected neural network architecture of the first multilayer perceptron 610 represents a first learnt feature pre-processing stage that converts input data associated with the proposed transaction to a feature vector for further processing. In certain cases, the fully-connected neural network architecture may learn certain relationships between the elements of the transaction feature data 608, e.g. certain correlations, and output an efficient representation that takes account of these correlations. In one case, the input transaction data 608 may comprise integer and/or floating-point numbers and the output of the first multilayer perceptron 610 may comprise a vector of values between 0 and 1. The number of elements or units (i.e., output vector size) of the first multilayer perceptron 610 may be set as a configurable hyperparameter. In certain cases, the number of elements or units may be between 32 and 2048.

It should be noted that the input transaction data 608 may comprise data from the proposed transaction (e.g., as received via one or more of a client device, POS device, merchant server device and payment processor server device) and data associated with the proposed transaction that is not contained in data packets associated with the proposed transaction. For example, as explained with reference to FIGS. 1A to 1C and 2A and 2B, the input transaction data 608 may further comprise ancillary data (such as 148 and 242), where the ancillary data is retrieved by the machine learning system 600 (such as is shown in FIG. 1C) and/or by the payment processor server 140 (such as is shown in FIG. 1A or 1B). The exact content that is included in the input transaction data 608 may vary between implementations. The present examples are concerned with a general technical architecture for the processing of transaction data rather than the exact form of that data. In general, as the machine learning system 600 comprises a set of neural network layers, parameters may be learnt based on whatever input data configuration is desired or based on what input data is available. The present examples are concerned with the engineering design of such a technical architecture to allow for transaction processing at the speed and scale described herein.

In the example of FIG. 6A, the transaction time data 606 and the output of the first multilayer perceptron 610 are received by the first processing stage 603. The first processing stage 603 comprises a recurrent neural network architecture 620, which is shown as a processing layer A in FIG. 6A. The recurrent neural network architecture 620 receives the transaction time data 606 and the output of the first multilayer perceptron 610 and generates output data by way of a neural network mapping (e.g., one or more parameterised functions). For example, the recurrent neural network architecture 620 uses an internally maintained state to map the transaction time data 606 and the output of the first multilayer perceptron 610 to a fixed size vector output of a predefined size. The output of the recurrent neural network architecture 620 is then received by the second processing stage 604 and is used to generate the scalar output 602. An example configuration for the recurrent neural network architecture 620 is shown in FIG. 6B. In general, the first processing stage 603 produces a specially adapted representation of irregularly spaced temporal data that is particularly suited to the time-series data properties of the transaction data. For example, comparative neural approaches to time-series processing often require regularly spaced time samples. This does not fit the asynchronous nature of payment requests. In certain cases, the recurrent neural network architecture 620 may comprise learnable functions. In other cases, which may be preferred for certain implementations, the recurrent neural network architecture 620 may use fixed or provided parameters to implement a function, such as a time decay function. The parameters in this case may be configured based on the characteristics of the broader model and by domain knowledge. In either case, the parameters of the recurrent neural network architecture 620 may enable an intelligent aggregation of features for transactions at unequally-spaced time intervals.

The second processing stage 604 of FIG. 6A comprises one or more attention neural network architectures 660. In cases where a plurality of attention neural network architectures is used, there may be b architectures provided in parallel, e.g. to provide a multiheaded attention arrangement where each of the b architectures receive the same input but have different neural network parameters, enabling them to extract different sets of features from the same data. More specifically, different attention heads may focus on different time periods, e.g. one attention head might focus on transactions from the past hour whereas another might focus on transaction from the past month. In this manner, a first attention neural network architecture receives at least transaction time data 606 and output data from the recurrent neural network architecture 620 and uses this to generate output data. If only one "head" is used for the second processing stage 604, then this output data is passed to a second multilayer perceptron 690 for generation of the scalar value 602. If multiple "heads" are used for the second processing stage 604, then the output data for each attention neural network architecture may be combined to form output data for the second processing stage 604. In one case, the output data for each attention neural network architecture may be at least concatenated. In one further case, the concatenated output data may be input to at least one fully-connected neural network layer for dimensionality reduction. For example, this function may be provided by the second multiplayer perceptron 690. An example configuration for each attention neural network architecture 660 is shown in FIG. 6C. The first and/or second multilayer perceptrons 610 and 690 may comprise, as an example, between 1 to 10 dense or fully-connected layers (with corresponding activation functions such as ReLU functions) depending on implementations. Again, the number of elements or units (sometimes referred to as channels) for the first and/or second multilayer perceptrons 610 and 690 may range from 32 to 2048 and may vary between layers, e.g. may reduce from an input to output.

In FIG. 6A, at least the output of the second processing stage 604, i.e. in the form of output data from one or more attention neural network architectures 660, is mapped to the scalar output 602 by the second multiplayer perceptron 690. The output data from the last of the one or more attention neural network architectures 660 may comprise a vector of a predefined length (e.g., 1 to 1024 elements). The predefined length may be the same length as the output of the first multilayer perceptron 610 or, if multi-head attention is used, may be greater (e.g., as multiple output vectors are concatenated). In one case, the output length (i.e., size) of each attention head may be set as a separate hyperparameter. In certain test configurations, an output size for each attention head ranged from ~5 to ~500 elements or units. The second multiplayer perceptron 690 comprises a fully-connected neural network architecture comprising in turn a plurality of neural network layers to receive at least output data from the second processing stage 604 and to map the output data to the scalar value 602. This may comprise a series of dimensionality reducing layers. A last activation function in the plurality of neural network layers may comprise a sigmoid activation function to map an output to the range of 0 to 1. The second multiplayer perceptron 690 may be trained to extract correlations between features that are output by each of a plurality of attention heads and to apply one or more non-linear functions to finally output the scalar value 602.

As shown by the dashed lines in FIG. 6A, in certain variations, one or more skip connections 692, 694 may be provided that respectively bypass one or more of the first processing stage 603 and the second processing stage 604. The first skip connection 692 bypasses the first processing stage 603 and the second skip connection bypasses the second processing stage 604. Skip connections such as these may improve training (e.g., by allowing for gradients to bypass each layer and so avoid "vanishing gradient" issues). They may also improve accuracy by allowing later layers to operate on correlations between earlier inputs and the outputs of intermediate layers (e.g., there may be certain cases where a simple mapping between features output by the first multilayer perceptron 610 and one of the attention layers 660 is useable by the second multilayer perceptron 690 to make a "better" decision than just the output of the attention layer 660 alone).

In certain cases, the output of the first multilayer perceptron 610, which may be considered a normalised transaction data feature vector, may be concatenated, or otherwise combined with output data of the recurrent neural network architecture 620, to provide an input to the one or more attention neural network architectures 660. In one case, the first skip connection 692 may comprise a residual connection. Similarly, in certain cases, the output of the first multilayer perceptron 610, which may be considered a normalised transaction data feature vector, may be concatenated, or otherwise combined with output data of the one or more attention neural network architectures 660, to provide an input to the second multilayer perceptron 690. In one case, the second skip connection 694 may comprise a residual connection. In general, in FIG. 6A, there is a shown with dashed lines: a first skip connection 692 around the first processing stage 603 (i.e., Layer A) and a second skip connection 694 around the second processing stage 604 (i.e., Layer B); if both skip connections 692, 694 are provided there is effectively a skip connection around both the first and second processing stage 603, 604 (i.e., Layers A and B combined). Residual connections may improve the ease with which the neural network layers learn a mapping function. Whether the skip connections are used, and whether they combine via concatenation, addition, or another operator (e.g., subtraction or multiplication) may be set as hyperparameters in configuration data for the machine learning system 600 and may be set based on experimentation for particular implementations.

The arrangement of FIG. 6A has been found to be particularly beneficial for fast inference on input transaction data, which is required for sub-second transaction processing. For example, the number of layers in the entire network architecture is low by modern deep learning standards, which contributes to a low latency when performing inference on live transaction data. The first multilayer perceptron 610 is advantageous arranged to pre-process transaction data, e.g. using learnable parameters, so that they are provided in a form that allows for high accuracy of the remaining arrangement and that facilitates stable training of the arrangement. The use of relative time differences between the current transaction and prior transactions allows time information to be quantified in a format that is useable by the arrangement to determine the scalar output and allows for time to be represented in an efficient manner that is not dependent on absolute timestamp values (which may be large or unwieldy). Moreover, dependence on absolute timestamp values may lead to lack of generalisability across entities and/or time periods, which in turns may lead to poor performance of the machine learning model. The first processing stage 620 is configured to process the transaction feature vector output by the first multilayer perceptron 610 in a stateful manner, wherein the use of a previous state is determined by way of parameters that operate on time difference data with respect to the proposed transaction, e.g. the recurrent neural network architecture 620 is configured to use previous transaction data (e.g., how to "remember" or "forget") based on a time gap between the proposed transaction and a previous transaction, where the previous transaction data is an aggregated function of transaction feature vectors for a plurality of previous transactions. Hence, the first processing stage 603 has a potentially infinite scope with regard to previous transactions and is arranged to extract features based on this scope. In particular, the recurrent neural network architecture 620 is only "aware" of previous transactions for the same entity via the previous state vector for that entity (indicated by the input from the previous iteration 622 in FIG. 6B). The state vector has a fixed size, with the exact size comprising a hyperparameter of the model (e.g., this may be in the range of 4 to 128 elements). Hence, the recurrent neural network architecture 620 must summarise the past behaviour of any entity up to any point in time within the form of this fixed size vector. This contrasts then with the second processing stage 604, which access to historical events for the entity, such as all the events or a subset of events based on event times. In certain cases, the second processing stage 604 may have a fixed input range (e.g., a fixed number of input feature vectors it considers) but may apply (self) attention over that fixed input range. In certain cases, the input range of the second processing stage 604 may be defined in terms of event time, e.g. an attention head might only look at events for the same entity which happened within the past month, where the time range of each attention head is defined as a hyperparameter. In certain cases, the input range of the second processing stage 604 may not have a time limit, and so may incorporate all historical events for the same entity. Any chosen configuration may depend on the average number of event data items available for each entity and/or any processing resource constraints (e.g., time limited attention heads may be faster and easier to implement).

The first and second processing stages 603, 604 thus apply differentiated yet complementary processing that allows for information to be extracted for determination of the scalar value 602. The second processing stage 604 applies neural attention in an efficient manner that is capable of fast inference at scale. Indeed, both the neural network architectures of the first and second processing stages 603, 604 are configured for fast computation to cope with the scale of parallelised transaction processing (e.g., milliseconds for inference as shown in FIG. 6A and parallelisable to manage 1000-2000 transactions per second on server computer devices). For example, both the first and second processing stages 603, 604 omit certain components that are used in comparative neural network architectures yet still allow for accurate inference.

An example configuration for the recurrent neural network architecture 620 of the first processing stage 603 is shown in FIG. 6B. The recurrent neural network architecture 620 comprises three input interfaces to receive input data: a time difference interface 606 to receive data useable to output a time difference between the proposed transaction and the prior transaction; a transaction data input interface 618 to receive data for the proposed transaction; and a state input interface 622 to receive state data for a previous iteration. These interfaces may comprise passive interfaces, e.g. may comprise method APIs that receive data via referenced memory locations and/or may comprise active interfaces, e.g. may apply pre-processing if this has not already been applied (e.g., that compute a time difference based on absolute time data). Functionally, operation is the same. The time difference interface 606 may receive (or compute based on received time data) a time interval $\Delta t_{i,i-1}$ comprising data representing a time interval between a current proposed transaction i and a previous or prior transaction i-1, where i represents an iteration index for the recurrent neural network architecture 620. The exact form of the time interval $\Delta t_{i,i-1}$ may vary between implementations. Although an interval between the ith and i-1th transaction is shown, in certain cases, different intervals may be used, e.g. between the ith and jth transactions (where i>j), with an appropriate retrieval of the state for the jth transaction. The time interval $\Delta t_{i,i-1}$ 606 may be represented as one or more of: an integer value in seconds between Unix epochs, a floating point value representing a decimal period in hours, a vector of seconds, minutes, hours, days, months, years, where each element is an integer value or a normalised value between 0 and 1; or a time difference embedding from an embedding layer. In a preferred case, the time interval $\Delta t_{i,i-1}$ 606 may comprise a scalar float (i.e. floating-point) value representing the number of seconds elapsed between the previous transaction for the same entity and the proposed transaction. In another case, the time difference interface 606 may receive time-stamp data for the proposed transaction and a prior transaction and may output a data representation of the time interval $\Delta t_{i,i-1}$. The transaction data interface 618 may receive a transaction feature vector (i.e. a fixed length vector) as output by the first multilayer perceptron 610, e.g. with each element comprising a normalised value between 0 and 1.

The recurrent neural network architecture 620 has a stored state, which may be retrieved from memory or a communicatively coupled storage device. The recurrent neural network architecture 620 receives state data from the previous iteration (e.g., i-1) at the state input interface 622 and outputs state data for the present iteration (e.g., i) at a state output interface 624. The state data received at the state input interface 622 is retrieved following a previous application of the recurrent neural network architecture 620 to data for a set of previous transactions that include the prior transaction. In general, the recurrent neural network architecture 620 is configured to operate on one event (e.g., one transaction or a transaction-related event) at a time (i.e., per iteration); FIG. 6B shows schematic processing as defined for a single event for a common (i.e., the same) entity (although the computation may be vectorized and/or parallelised across multiple events and/or entities for efficiency). The recurrent neural network architecture 620 of FIG. 6B thus comprises a processing layer that computes [current_output, new_state] from [current_input, previous_state], where each of those data items may comprise a fixed length vector representation. The fact that a current output (e.g., 630) depends on the input for not just the current event but from a set of historical events for the same entity is a property of the recurrent nature of the layer (e.g., as each current output depends on a previous state, and the previous state in turn depends on a further previous state, and so on).

The recurrent neural network architecture 620 comprises a forget gate 626 to modify the state data for the previous iteration based on data output by the time difference input interface 606. For example, the time difference interface 606 may output data representing a time interval $\Delta t_{i,i-1}$ (i.e. data representing a time difference between the proposed transaction and a prior transaction) and this is used as an input to the forget gate 626. Within the forget gate 622, a time difference encoding $\phi_d$ 628 is applied to the data representing a time interval $\Delta t_{i,i-1}$ to generate an activation vector for the forget gate. The time difference encoding $\phi_d$ 628 may implement a parameterised function, such as a time decay function. In one case, the time difference encoding $\phi_d$ 628 may be applied as a vectorized exponential time decay function of the form $f(s)=[e^{(-s/w\_1)}, e^{(-s/w\_2)}, \ldots, e^{(-s/w\_d)}]$, i.e. as a series of parameterised time decay computations with [w_1, w_2 ... w_d] comprising a set of weights that represent a "decay length" in seconds and where d is the size of the recurrent state vector. In this case, $\Delta t_{i,i-1}$ is passed to the function as s to output a vector of length d, e.g. may be passed as a scalar float value representing the number of seconds elapsed between the previous event (e.g., transaction) for the same entity and the current event (e.g., the proposed transaction). The time difference encoding $\phi_d$ 628 may comprise a weighting vector or matrix that is used to transform a representation of the time interval $\Delta t_{i,i-1}$. The time difference encoding $\phi_d$ 628 may be fixed (e.g., manually configurable) parameters and/or may comprise trainable parameters of the recurrent neural network architecture 620. In an exponential function case, the decay lengths may comprise (or be trained) a mixture of different values representing decays from a few minutes to a few weeks such that both short-term and long-term behaviour is captured. The activation vector is then used to weight the state data received at the state input interface 622 to output a modified state vector. In FIG. 6B, the activation vector is applied to the state data for the previous iteration using an elementwise multiplication 632 (e.g., the Hadamard product is computed). In this example, the state data comprises a vector that is the same length as the transaction feature vector output by the transaction data input interface 618 (i.e., the same length as the output of the first multilayer perceptron 610). The forget gate 626 effectively controls how much of the state data from the previous iteration is remembered and how much is forgotten. The configuration shown in FIG. 6B is purposefully arranged so as to allow tractable training and fast inference for the present transaction processes context. For example, certain other gates provided in comparative implementations, such as input or output gates are omitted.

Following modification via the forget gate 626, the modified state data is combined, via combinatory logic 634, with the transaction feature vector output by the transaction data input interface 618 to generate output data 630 for the proposed transaction (and the present iteration i). The combinatory logic 634 may implement an element-wise addition (i.e., normal vector addition). The output data 630 also forms the output for the state output interface 624. The output of the state output interface 624 may then be cached in memory or otherwise stored until a next transaction.

In a preferred implementation, the state data used by the recurrent neural network architecture 620 is entity dependent, i.e. is specific to a particular user, account holder or merchant account. In this manner, the appropriate entity may be identified as part of the transaction data pre-processing and the machine learning system 600 may be configured for that entity. In one case, the machine learning system 600 may apply the same parameters for the neural network architectures for each entity but may store state data separately and may only retrieve historical transaction data and/or ancillary data that is associated with (e.g., indexed by) that entity. As such, the machine learning system 600 may comprise an entity state store, e.g. as described with reference to FIGS. 2A and 2B, whereby the data for different entities may be effectively partitioned. In other cases, the parameters for the forget gate 626 may be shared across multiple entities. This may be advantageous to reduce the number of learnable parameters for each entity of the whole machine learning system. For example, the exponential time decay weights described above may be fixed and shared across multiple entities, whereas the state data may be unique to each entity.

FIG. 6C shows an example configuration for the second processing stage 604. FIG. 6C shows an example attention neural network architecture 660 that may form one "head" of an attention arrangement with one or more "heads". In FIG. 6C, the attention neural network architecture 660 receives input from the first processing stage 603, where the input relates to a current event and a set of previous events for the same entity. Each "head" of the attention arrangement may receive the same input data but may comprise different parameter data, whereby each "head" is able to learn a different set of parameters. The example configuration of FIG. 6C may be referred to as a self-attention architecture as the attention neural network architecture 660 determines what portions of an input to attend to based in part on that input. In the example configuration of FIG. 6C, an input feature vector is generated based at least in part on previous iteration outputs from the first processing stage 603 and is weighted based on a current iteration output for the first processing stage 603. The input feature vector is also generated based on data representing a time difference, such that the time intervals between the proposed transaction and one or more prior transactions can influence the weights that are applied. In effect, this provides for differential weighting based on how temporal data is irregularly spaced. In general, the attention neural network architecture 660 comprises neural network layers to apply attention weights to the input feature vector to generate output data for the attention neural network architecture 660. The attention weights are computed based on the input feature vector and current output data from the first processing stage 603. This is explained in more detail below.

In FIG. 6C, the attention neural network architecture comprises a time difference interface 662, a historical input interface 664 and a current input interface 666. The time difference interface 662 is similar to the time difference interface 606 of the recurrent neural network architecture 620 but in this case is configured to output a vector of relative time intervals $\Delta t_{i,i-1}, \ldots, \Delta t_{i,1}$, i.e. a plurality of time differences between the current proposed transaction and (each of) a set of historical or prior transactions. For example, this may be a plurality of concatenated time interval values, where each time interval value is similar to the form output by the time difference interface 606. The time difference interface 662 may receive time data as this vector of relative time intervals or may receive absolute time data and compute the relative time intervals based on this absolute time data. In preferred examples, the time difference interface 662 receives time difference data comprising at least the data representing a time difference as received by the time difference input interface 606 and one or more time differences between the proposed transaction and one or more further prior transactions. The historical input interface 664 receives historical output data from the first processing stage 603. For example, this may comprise output of the recurrent neural network architecture 620 that is buffered over a predefined time period or number of iterations.

In one case, both the historical input interface 664 and the time difference interface 662 output data for computation relating to a fixed or predefined number of previous iterations (which is i–1 in the example and is referenced as T below). Or in other words, the historical input interface 664 and the time difference interface 662 may be configured to output data for computation relating to a subset of historical events. The subset may be constrained based on a bounded number of events (e.g., the 10 most recent events for the entity), a configured time period (e.g., the past month for the same entity), or both (e.g., events for the past month capped at the most recent 10 events). This is preferred to manage data size constraints and computing tractability. However, if a number of transactions are small, the number of previous iterations may expand with each iteration.

Lastly, the current input interface 666 receives current output data from the first processing stage 603. For the attention neural network architecture 660 shown in FIG. 6C, this is at least the output data from the recurrent neural network architecture 620 for the current iteration (i.e., output data 630 in FIG. 6B). In certain cases, e.g. when a skip connection such as that shown by the dashed line in FIG. 6A is used, the current input interface 666 may receive a combination of an output from the first processing stage 603 (e.g., output data from the recurrent neural network architecture 620) and the input for the first processing stage 604 (e.g., the input transaction data 618 received as shown in FIG. 6B).

In the example of FIG. 6C, time difference data received from the time difference interface 662 is modified using a time difference encoding $\phi_e$ 668. Like the time difference encoding $\phi_d$ 628 in FIG. 6B, the time difference encoding $\phi_e$ 668 may comprise a parameterised function that is applied to time difference data. The parameters for the time difference encoding $\phi_e$ 668 may be fixed or trainable (i.e., learnt) depending on implementations. In certain implementations, the time difference encoding $\phi_e$ 668 may comprise an exponential time decay function similar to that described with respect to the time difference encoding $\phi_d$ 628 in FIG. 6B. In other implementations it may comprise a fully-connected neural network layer. In one case, the time difference encoding $\phi_e$ 668 may output a tensor comprising a collection of vectors (i.e., a matrix), with one vector per event time difference. Each vector may be computed based on a time elapsed between a particular historical event and the current invention (e.g., a current proposed transaction). In one case, each vector within the time difference encoding $\phi_e$ 668 may be computed in a similar manner to the time difference encoding $\phi_d$ 628 in FIG. 6B, with this being repeated for each time difference. In other cases, a different positional encoding may be used, such as an encoding based on a (weighted) sinusoidal function. An example of a sinusoidal positional encoding is described in the paper "Attention is All You Need" by Vaswani et al (published on arXiv on 6 Dec. 2017), which is incorporated by reference herein. The time difference encoding $\phi_e$ 668 may be parameterised based on a matrix of weights that may be used to implement the time encoding. As for the time difference encoding $\phi_d$ 628 in FIG. 6B, parameters for the time difference encoding $\phi_e$ 668 may be fixed (e.g., supplied as pre-defined configuration values) and/or learnt via (end-to-end) training.

In the present example, the output of the time difference encoding $\phi_e$ 668 comprises a matrix of relative time encodings, with one encoding vector for each time difference. This is received at concatenation block 670. Concatenation block 670 concatenates the relative time encodings and the historical output data from the first processing stage 603, e.g. a set of buffered outputs from the recurrent neural network architecture 620 for iterations i–1 to 1. For example, each vector of time encodings relating to a particular time difference may be concatenated with a vector for a corresponding encoded event. Concatenation block 670 thus generally outputs a feature tensor that combines time difference data and historical output data from the first processing stage 603 (e.g., where this input data is in vector form). The feature tensor is then used as an input for key vector and value vector determination. The feature tensor may be arranged as a longer flattened vector or as a multidimensional array (e.g., a buffer-like data structure with one dimension indexed by an iteration index).

The attention neural network architecture 660 in FIG. 6C may be seen to implement a single-head self-attention system. The attention system uses a key vector, a query vector, and a value vector. In the example of FIG. 6C, the value vector is computed using a value vector computation operation 672, the key vector is computed using a key vector computation operation 674, and the query vector is computed using a query vector computation operation 676. In certain cases, vectors may be computed for each iteration to generate an attention weight for that iteration. Both the value vector computation operation 672 and the key vector computation operation 674 receive the output of the concatenation block 670 as input, i.e. receive a feature vector or elements of a feature tensor computed using the time difference data and historical output data from the first processing stage 603. The terms key, query, and value are used in the art to refer to different representations that are used to apply attention. For example, these terms were developed with reference to informational retrieval systems wherein a query is mapped against a set of keys to return one or more values as matches. In neural attention, at a high level, the query vector is compared with the key vector and is used to determine a set of attention weights. In certain cases, one or more query vectors may be compared with multiple key vectors (e.g., via matrix operations) to generate a set of attention weights where each weight relates to a different iteration index. The set of attention weights are applied to at least one value vector to provide a weighted vector output. In certain cases, weighted value vectors for each iteration are combined in an end-weighted sum to generate an output vector (such as 688). Each of the value, key, and query vector computation operations 672, 674 and 676 comprise the application of one or more sets of parameter weights (e.g., as applied via one or more neural network layers), where the parameter weights are learnable parameters of the attention neural network architecture 660. As such, the attention neural network architecture 660 "learns" how to transform the input feature tensor output by the concatenation block 670 to generate appropriate key and value vectors, and how to transform the current output data from the first processing stage 603 to generate an appropriate query vector. In effect, the query vector that is computed by the query vector computation operation 676 represents how the current output of the recurrent neural network architecture 620 should be represented to look for information in the input feature vector (i.e., the time difference data and the previous outputs of the recurrent neural network architecture 620) to use to weight the input feature vector (i.e., emphasise certain aspects and de-emphasise other aspects). As the weights that are used in the each of the value, key, and query vector computation operations 672, 674 and 676 are trainable parameters, via training, the attention neural network architecture 660 learns how best to manipulate the input data to generate output data that leads to accurate scalar outputs that are representative of behavioural anomalies in transactions.

Turning to the mechanisms that apply attention, the query vector output by the query vector computation operation 676 is applied to the key vector output by the key vector computation operation 672 using a first dot (i.e., scalar) product operation 678, which computes the dot product of the key vector and the query vector. This may be performed for a set of multiple key vectors and/or multiple query vectors so as to output a result of the dot product for each iteration in the historical data. In parallel, a further time difference encoding $\phi_w$ 680 is applied to the time difference data output by the time difference interface 662. The time difference encoding $\phi_w$ 680 may again apply a function similar to that described for one or more of the time difference encoding $\phi_d$ 628 and the time difference encoding $\varphi_e$ 628. In one case, the time difference encoding $\phi_w$ 680 outputs one value for each pair of (historical event, current event) for the same entity. The value may comprise a scalar value that is a function of the time elapsed between the historical event and the current event, e.g. a function of $\Delta t_{i,j}$ where i is the current event and j is the historical event. The function applied by the time difference encoding $\phi_w$ 680 may take various forms. As before, parameters for the function may be fixed or trainable. In one case, parameters may be configured to assign higher weights to events from a certain time interval (e.g., events from the past week for the same entity), to encourage the attention layer to attend more to events from that time interval. Hence, via by controlling the parameters of the time difference encoding $\phi_w$ 680, the particular attention layer may be configured to attend more or less to particular time intervals. If the parameters are defined as configuration parameters, this may allow operators to control the operation of the attention layer; if the parameters are learnt during training of the neural network architecture, they may converge to values that increase successful classification of anomalies.

The output of applying the time difference encoding $\phi_w$ 680 is then combined with the dot product output by the first dot product operation 678 at combinatory logic 682. In operation 682, the time-based weight for (historic event, current event) is added to the dot product between (query vector for current event, key vector for historic event), which may be a scalar. Combinatory logic 682 effectively adjusts an initial set of attention weights computed using the key and query vectors with the weighted time difference data. The weighting of the time difference data output by the time difference interface 662 via the time difference encoding $\phi_w$ 680 is important because it allows the attention weights to be adjusted to encourage the attention neural network architecture 660 to attend more heavily to certain samples in some time intervals more than others. For example, it has been found in some tests, that this adjustment often emphasises transaction data features within a learnt time range, such as around a week from the proposed transaction.

Finally, to complete the calculation of the attention weights from the input feature tensor and current output data from the first processing stage, a softmax operation 684 is applied and the dot (i.e. scalar) product of the output of the softmax operation 684 and one or more value vectors output by the value vector computation operation 672 is computed by a second dot product operation 686. The second dot product operation 686 effectively applies normalised attention weights output by the softmax operation 684 to the one or more value vectors to provide output data 688 for the attention neural network architecture 660. The softmax operation 684 applies a softmax or normalised exponential function to output a set of normalised attention weights that may be seen as a set of probabilities (i.e., they sum to 1 and are each in the interval 0 to 1). The second dot product operation 686 then computes a weighted sum of the iterations of the input feature tensor as weighted by the computed attention weights.

For example, the output of the recurrent neural network architecture may be represented as a vector $A_j$ of length L for each iteration j. A time difference between a current iteration i and a prior iteration j, where i≠j, may be represented as $\Delta t_{i,j}$. This time difference may be a scalar floating-point value. In operation, the recurrent neural network architecture receives $A_{i-j}$, which represents the previous state (e.g., j=i−1), and encodes the time difference using the time difference encoding $\phi_d$. If $\phi_d$ is a vector of parameters, e.g. a set of time decay weights of length K then the forget gate 626 first computes $f_i(\phi_d, \Delta t_{i,j})$ then computes the modified state $S_i$ as $S_i=f_i (\phi_d, \Delta t_{i,j}) \cdot A_j$, where · is an element-wise multiplication, and the output $A_i=S_i+X_i$ where $X_i$ is an input transaction data feature vector for iteration i that is also of length K (e.g., as output by the first multilayer perceptron 610). Turning now to the attention neural network architecture 660, the time difference interface 662 may receive a multidimensional array (e.g., a vector) comprising T time differences, i.e. $\Delta t_{i,j}$ for j=i−1 to i−T. If each time difference is a floating-point scalar as above, then the input to the time difference interface 662 may be a vector $\Delta_i$ of size T. Similarly, the historical input interface 664 may receive a multidimensional array $H_i$ of size K by T representing the buffered output $A_j$ (for j=i−1 to i−T) of the recurrent neural network architecture. The current input interface 666 then receives $A_i$ for the current iteration. The time difference encoding $\phi_e$ 668 may similarly implement a parameterised function $f_e(\phi_e, \Delta_i)$ where $\phi_e$ are a set of parameters for the time difference encoding. This function may output a vector for each time difference, i.e. a multidimensional array (or matrix) $E_i$ or size M by T, where M is the length of the time difference encoding. The concatenation operation 670 may then stack corresponding ones of the T vectors from each source to output a (K+M) by T matrix. The value and key computation operations 672 and 674 may respectively generate value and key vectors for each of the T samples forming the input (i.e., the concatenated T time intervals and buffered outputs). At the first dot product operation 678, the dot product of the query vector and each of the T key vectors may be computed to generate T initial attention weights. The time difference encoding $\phi_w$ 680, may apply a matrix of parameters size T by T and, following application of the parameterised function $f_w(\phi_w, \Delta_i)$, generate a weighted time vector $D_i$ of length T (i.e., $D_i=f_w(\phi_w, \Delta_i)$), which is then added to the vector of T initial attention weights at combinatory logic 682, i.e.

$$\alpha_i' = \alpha_i + D_i.$$

As described above, there is a scalar time-based weight from the time difference encoding $\phi_w$ 680 and a scalar key-query dot-product weight and these are added together (combined) at component 682. The softmax function is then applied at the softmax operation 684, $$a_i'' = softmax(\alpha_i').$$

The vector of T attention weights $$\alpha_i''$$

may then be used to weight each of the T value vectors output by the value vector computation operation 674 and the output $B_i$ may be generated as $$B_i = \sum\nolimits_{j=i-T}^{i=1} \alpha_{i,j}'' V_{i,j}$$

where $$\alpha_{i,j}''$$

is one of the T attention weight values and $V_{i,j}$ is a corresponding value vector. The resulting output vector $B_i$ is then the same length as the value vectors (which may be M+K) or a customisable length set by a matrix multiplication within the value vector computation operation 672.

The second processing stage 604, using one or more attention neural network architectures 660 as described above, allows for sequences of actions or events related to a proposed transaction, which may be data received with a transaction request and/or ancillary data, to be evaluated and weighted, wherein the relative times of various actions making up the features may be used as part of the weighting. In certain examples, the input transaction features 608 may also include other actions associated with a user such as sequences of measured user inputs such as mouse clicks and/or changes in an account history. This allows the output scalar value to be sensitive to patterns within the input data. For example, two transaction requests within a few seconds may relate to a detected pattern that differs from two transaction requests within a few days.

The architecture of the first example configuration as shown in FIGS. 6A to 6C thus provides benefits over comparative transaction processing methods and systems that do not allow the above patterns in sequences of data to be detected. Concretely, the first example configuration as shown in FIGS. 6A to 6C provides accuracy improvements such as reducing false positives and increasing true positives and avoids the errors and suboptimal results that have traditionally been found when attempting to apply machine learning within the contexts described herein. For example, the machine learning architecture described above is able to identify and make inferences from sequences of asynchronous actions over time with an appropriate awareness of time intervals and temporal densities of individual actions of different types. By using the stateful processing of the first processing stage 603 and the adaptive attention mechanism of the second process stage 604, the first example configuration is able to learn useful functions established long-term trends of an entity (such as a user or a merchant).

Although the first processing stage 603 and the second processing stage 604 of FIG. 6A operate synergistically together, it is possible in certain examples to implement each of these separately, e.g. with or without one or more of the first and second multilayer perceptrons 610 and 690. For example, the second processing stage 604 may be omitted in certain implementations such that the second multilayer perceptron 690 operates solely on the output of the first processing stage 603, or the first processing stage 603 may be omitted such that the second processing stage 604 receives feature vectors output by the first multilayer perceptron 610 (e.g., $X_i$ instead of $A_i$ for one or more of current and historical data).

In certain cases, the forget gate 626 may be implemented as a form of time decay processing, where neural network cells (i.e., recurrent neural network architecture 620) have a local memory (i.e., state) and that memory is time-decayed prior to processing of a new data sample. The time difference encoding $\phi_d$ 628 may in certain examples comprise one or more exponential time decay factors.

The first processing stage 603 may be seen as computing a weighted summation of a new input relative to prior inputs. The forget gate 626 acts as a form of time-decay to adjust the contribution of past transactions to the summation. The time-decay can be purely a function of the time, since pairs of transactions may be considered to occur independently of anything that happened in the intervening period. As a result, the first processing stage 603 provides long-term storage for the contribution of prior transactions that are not the most recent transaction.

As described above, in certain implementations, time difference encodings (such as one or more of $\phi_d$ 628, $\phi_e$ 668 and $\phi_w$ 680) may be applied as a function of the data representing the time interval, $f_i(\phi_i, \Delta t_{i,j})$ where $\phi_i$ are a set of parameters. In at least the forget gate 626 implementation, the function may be constrained such that $f(\Delta t_{i,i-a})*f(\Delta t_{i,i-b}) = f(\Delta t_{i,i-a} + \Delta t_{i,i-b})$. For example, the function may comprise an exponential function. In one case, a weighting may be applied followed by an exponential activation function. In this case, a contribution of an iteration is dependent only on the gap between iterations and is independent of any intermediate iterations.

For example, in the above variation, consider a case with three events or actions, e.g. related to three transactions. A first event (A) occurs at midnight; a second event (B) occurs at 3 a.m. (i.e., 3 hours after event A); and a third event (C) occurs at 9 a.m. (i.e., 6 hours after event B and 9 hours after event A). The recurrent neural network architecture may determine a current state $S_i$ from a previous state $S_{i-1}$ based on the interval between the previous event (i−1) and the current event (i), before adding it to the inputs $X_i$ for the current event. In this case, for every update, recurrent neural network architecture may compute the state $S_i = X_i + f(t_i - t_{i-1}) \cdot S_{i-1}$. For the three events, the various states may be computed as $S_A = X_A + 0$, $S_B = X_B + f(3 \text{ hours}).S_A$, and $S_C = X_C + f(6 \text{ hours}).S_B$, which is equivalent to $S_C = X_C + f(6 \text{ hours}).X_B + f(6 \text{ hours}) \cdot f(3 \text{ hours}). X_A$. When $f(\Delta t_{i,i-a})*f(\Delta t_{i,i-b}) = f(\Delta t_{i,i-a} + \Delta t_{i,}$ $_{i-b})$, e.g. in a case where the function applies an exponential time decay, $S_C = X_C + f(6 \text{ hours}).X_B + f(9 \text{ hours})$. $X_A$, i.e. the state is a weighted linear combination of previous states where each contribution may be determined independently.

In one case, the forget gate 626 may apply an exponential time decay with one or more constant decay rates or decay factors (in certain cases, a plurality of such factors). These decay rates or factors may be set as hyperparameters of the recurrent neural network architecture 620 or may be learnt. In certain examples, an exponential time-decay can ensure that the contribution of a past action to the state of the recurrent neural network architecture depends solely on the elapsed time since the more recent event took place. In other words, the elapsed time between events attributable to an entity using this variation can be independent of any other action that has been performed in the intervening time. The use of time decay in the recurrent neural network architecture 620 also permits long-term memory storage, where the duration of the long-term memory storage can be set, for example, by a half-life parameter of the exponential time decay. In such a case, a function implementing a range of half-lives can be used, which encourages the encoding of action patterns and changes over different time periods.

In certain cases, all time encodings may use fixed (i.e., retrieved or supplied) parameter values (e.g., set as configuration data) rather than learnt parameters. In this case, all transformations and/or aggregations of historic and current feature vectors, in relation to the time difference, may be "imposed" on the architecture. This may increase the controllability of the system and facilitate (or even guide) training of the learnable parameters for the attention heads and/or multilayer perceptrons. For example, by setting values for exponential time decays for different time period, a useful time difference encoding is generated which provides a scaffold for the machine learning systems described herein to learnt features that may be mapped to these different time periods. Furthermore, non-learnable parameters increase the speed of processing and training which is particularly suited to fast, high-volume transaction processing.

Second Example Configuration for a Machine Learning System

FIGS. 6A to 6C above show one possible configuration for a machine learning system. A second alternative configuration 700 is shown in FIG. 7. The first and second configurations are not limiting, and certain examples described herein may be performed using machine learning models that differ from the configurations of both the first and second configurations, e.g. other neural network architectures and/or Bayesian configurations. Like the first example configuration 600, the second example configuration 700 may be used to implement one or more of the machine learning systems 160, 210, 402 (where the configuration may comprise an implementation loaded by the machine learning model platform 414), and 508 in FIGS. 1A to 1C, 2A and 2B, FIG. 4 and FIGS. 5A and 5B.

The second configuration 700 of FIG. 7 is based on a random forest model. The random forest model is applied to an input feature vector 710 and comprises a plurality of decision trees 720 that are applied in parallel. Each decision tree 722, 724, 726 outputs a different classification value $C_i$ 730. Three decision trees 722, 724, and 726 and three classification values 732, 734, and 736 are shown in FIG. 7 but there may be N decision trees in total, where N is a configuration parameter and may number in the hundreds. The classification values 730 are passed to an ensemble processor 740 that combines the classification values 730 from each of the decision trees 720 to generate a final scalar output 750. The ensemble processor 740 may compute a weighted output of the decisions of each decision tree 720 and/or may apply a voting procedure.

Training a Machine Learning System for Processing Transaction Data

In certain examples, machine learning systems, such as those described herein, may be training using labelled training data. For example, a training set may be provided comprising data associated with transactions that have been labelled as "normal" or "fraudulent". In one case, these labels may be provided based on reported fraudulent activity, i.e. using past reports of fraud. For example, data associated with transactions that have been approved and processed without subsequent reports of fraud may be labelled as "0" or "normal", whereas data associated with transactions that have been declined and/or transactions that have later been reported as fraudulent and otherwise marked or blocked may be labelled as "1" or anomalous. An example of this method of training is described with reference to FIG. 8.

In other examples described herein an improved pipeline for training a machine learning system is presented. This improved pipeline allows the training of machine learning systems, such as those described herein, that are adapted to process transaction data. The training pipeline allows the generation of synthetic data samples for training. This is particularly useful when attempting to train a machine learning system for the classification of anomalies in transactions (e.g., representative of fraud or other malicious activity), as there are typically few examples of "unexpected" action patterns that allows a balanced set of ground truth training labels. The improved pipeline for training a machine learning system involves adaptation to the feature vector generation process prior to applying the machine learning system and adaptation to the training procedure. In the sections below, the adaptation to the feature vector generation process will first be described, before describing the training itself. Examples of this method of training are described with reference to FIGS. 9 to 13.

Pre-Labelled Training Example

FIG. 8 shows an example 800 of training a machine learning system for transaction processing using a pre-labelled training set. This method may be used for cases where large bodies of labelled training data are available. However, this method may have limitations and an improved method of training for transaction processing is described below with reference to FIGS. 9 to 13.

In the example 800 of FIG. 8, training data 810 is obtained. The training data 810 comprises feature data 812, which may be feature values arranged as numerical tensors, and labels 814, which in this case are either a value of "0" representing a transaction associated with a normal pattern of actions or a value of "1" representing a transaction associated with an anomalous or fraudulent pattern of actions. In a training mode, the feature data 812 is provided to the machine learning system 840 for the output of a classification 850, which preferably comprises a scalar output. The machine learning system 840 is parameterised with a set of parameters 842. These may be initialised to a set of random values. In use a training engine 860 receives the output of the machine learning system 840 for a particular set of feature data and compares it with the label for that set of feature data. The training engine 860 may evaluate a loss function, such as a logistic log-loss function, that computes an error between the prediction and the label. This error is then used to adjust the parameters 842.

In the case that the machine learning system 840 comprises the first configuration 600 described with reference to FIGS. 6A to 6C, the parameters 842 may comprise neural network weights (and in certain cases biases, although these may be subsumed into the weights) associated with one or more of components 628, 668, 672, 674, 676 and 680. In this case, the feature data 812 may comprise both a current transaction associated with the label but also state data for the recurrent neural network architecture 620, time difference data and historical data that is used to generate the inputs for the attention neural network architecture 660.

In certain cases, training and/or validation of the machine learning system 840 may be performed using externally labelled data. This may be difficult to obtain but may originate from, for example, a data feed of transaction "chargeback" information that indicates which transactions have been refunded (as this may indicate that they were fraudulent or anomalous). In certain cases, correlation operates may be performed to relate transaction chargeback information to transactions that were disputed by a user (e.g., a refund may be due to a faulty product rather than fraud). Feedback on output may enable machine learning systems to operate adaptively and to self-correct against model drift over time.

Feature Vector Generation

Figure 9:
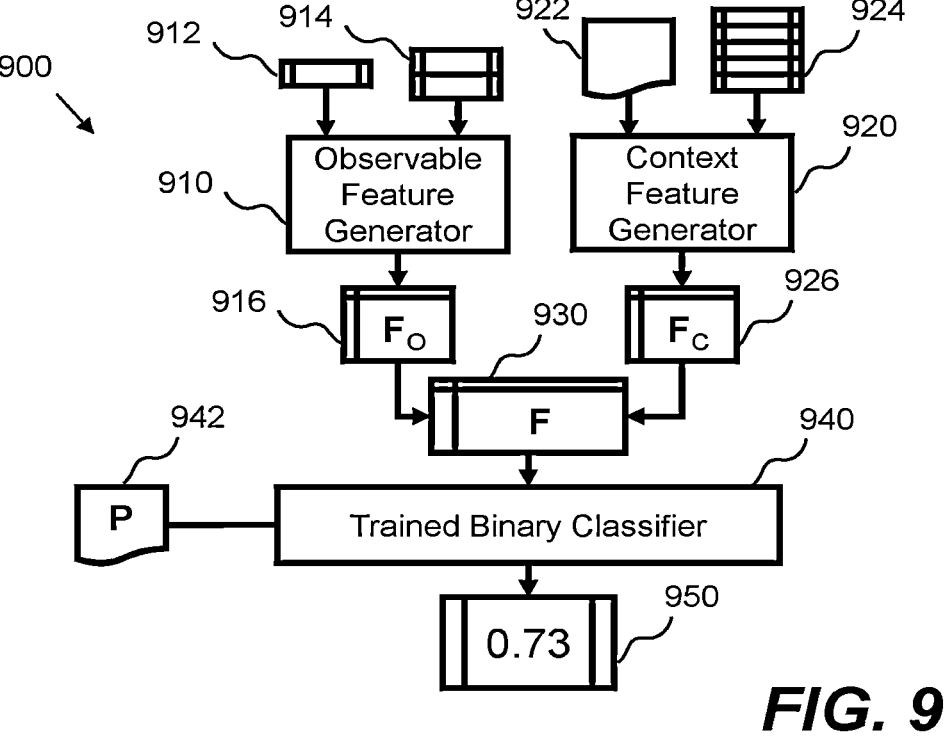
FIG. 9 is a schematic diagram showing an example machine learning system adapted for a method of training using synthetic data samples.

FIG. 9 shows an example machine learning system 900 with an adaptation to allow for training based on unlabelled data. In FIG. 9, the example machine learning system 900 generates feature vectors based on observable and context features. The machine learning system 900 comprises an observable feature generator 910 and a context feature generator 930. These are each configured to generate different portions of a feature vector 930 that is provided as input to a trained binary classifier 940. The binary classifier 940 is trained to map the input feature vector 930 to a scalar output 950. The scalar output 950 is indicative of a presence of an anomaly. For example, the binary classifier 940 may be trained on data that has two assignable labels. In certain cases, these labels may be "0" and "1" where "0" represents no anomaly and "1" represents the presence of an anomaly. In this case, the binary classifier 940 may output a value between 0 and 1 that is representative of a probability of an anomaly being present. The binary classifier 940 is parameterised with a set of parameters 942. For example, these may comprise weights for a neural network architecture and/or branch weights for a decision tree or random forest model. These parameters may be "learnt" via the methods of training that are discussed in more detail below. The scalar output 950 of the binary classifier 940 may be used to process a current or proposed transaction.

In FIG. 9, the observable feature generator 910 receives transaction data 912, 914 and uses this to generate an observable feature vector 916. The context feature generator 930 receives ancillary data 922, 924 and uses this to generate a context feature vector 926. The observable feature vector 916 and the context feature vector 926 are then combined to generate the overall feature vector 930. In one case, the observable feature vector 916 and the context feature vector 926 may be combined by concatenating the two feature vectors 916 and 926 to generate a longer vector. In other cases, combinatory logic and/or one or more neural network layers may be used that receive the observable feature vector 916 and the context feature vector 926 as input and map this input to the feature vector 930.

In FIG. 9, the observable feature generator 910 receives two types of transaction data. A first portion of transaction data 912 comprises data that relates to a particular transaction being classified. For example, this may comprise a current or proposed transaction as is shown being processed in FIGS. 5A and 5B. The first portion of transaction data 912 may comprise data that is derived from data packets received with a request to process the proposed transaction. The second portion of transaction data 914 comprises data relating to transactions that are within a group defined based on the proposed transaction. For example, these may comprise transactions that are within a defined temporal window. This may be defined based on an (absolute) predefined time range set with reference to a timestamp of the proposed transaction or based on a relative time range defined in relation to a discrete number of transactions (e.g., the last X transactions for a particular user associated with the proposed transaction). As such, the observable feature generator 910 may be said to generate the observable feature vector 916 based on recently observed data that at least includes data derived from the proposed transaction. In comparison, the context feature generator 920 generates the context feature vector 926 based on one or more of transaction data outside the temporal window and retrieved data relating to a uniquely identifiable entity for the proposed transaction. For example, FIG. 9 shows the context feature generator 920 receiving ancillary data 922 and historical transaction data 924. The uniquely identifiable entity may be a particular end user (e.g., a card holder) or merchant and the ancillary data 922 may be data retrieved from records that are associated with the uniquely identifiable entity (e.g., so-called static data that is separate from the transaction data representing past transactions). The ancillary data 922 may comprise the ancillary data 146 or 242 as described previously. The historical transaction data 924 may comprise data associated with transactions that are outside of the temporal window, e.g. data derived from transactions that are outside the aforementioned predefined time range set with reference to a timestamp of the proposed transaction or the relative time range. The context feature generator 920 may be configured to compute aggregate metrics across the historical transaction data 924 (or retrieve pre-computed aggregate metrics) and to then include the aggregate metrics in the context feature vector. Aggregate metrics may comprise simple statistical metrics or more advanced neural network extracted features.

Pipeline for Training a Machine Learning System

Figure 10:
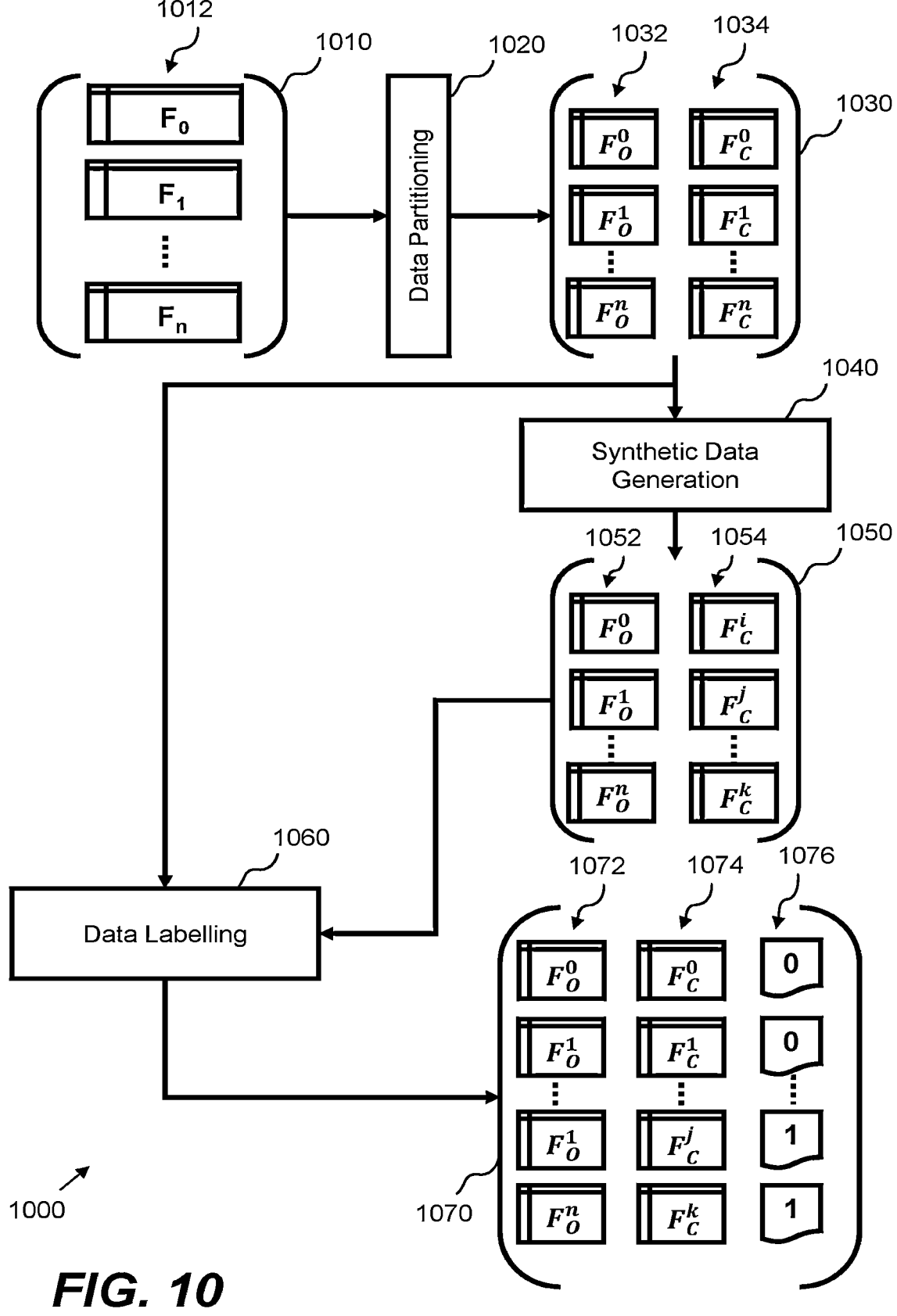
FIG. 10 is a schematic diagram showing a processing pipeline for generating synthetic data samples according to an example.

FIG. 10 shows a pipeline 1000 for training a machine learning system that builds upon the feature generation process of FIG. 9. The pipeline 1000 operates on a training set 1010 of data samples 1012. In this example, the training set 1000 comprises unlabelled data, i.e. the data samples 1012 do not have a label (i.e., an assigned data value) that indicates whether they relate to normal behaviour or whether they relate to anomalous behaviour. In other cases, some of the training set (i.e., at least a portion) may be labelled, but this may be a small proportion of the available data. The data samples may be feature vectors similar to the feature vector 930 shown in FIG. 9. The data samples may comprise feature vectors as generated by the arrangement of FIG. 9 and/or feature vectors that were not generated by the arrangement of FIG. 9 but that represent historical input data for a binary classifier forming the machine learning system being trained.

The pipeline 1000 begins with a data partitioning stage 1020. This operates on the training set 1010 and partitions the data of the data samples 1012 in the training set 1010 to generate partitioned data 1030. In particular, the data partitioning stage 1020 partitions the data samples into two feature sets: a first feature set 1032 representing observable features and a second feature set 1034 representing context features. The first and second feature sets 1032 and 1034 may be observable feature vectors 916 and context feature vectors 926 as described with reference to FIG. 9. In the case that the data samples 1012 were generated as feature vectors 930 using the pre-processing of FIG. 9, the data partitioning stage 1020 may comprise partitioning a concatenated feature vector (e.g., splitting the feature vector into two predefined sets of elements). In the case that the data samples 1012 comprise collections of data prior to pre-processing, e.g. similar to input data 912, 914, 922 and/or 924, the data partitioning stage 1020 may partition the data according to data source and/or time data. In one case, the data partitioning stage 1020 may function in a similar manner to the observable feature generator 910 and the context feature generator 920.

The first feature set 1032 may have properties similar to those of the observable feature vectors 916 and context feature vectors 926 as described with reference to FIG. 9. For example, the observable features may be derived, at least in part, from a temporal window of transaction data defined with respect to a transaction associated with each data sample. The context features may be derived, at least in part, from one or more of transaction data outside the temporal window and retrieved data relating to the uniquely identifiable entity for the transaction associated with the data sample. In FIG. 10, there are n sets of feature vector pairs $$F_O^i \text{ and } F_C^i$$

where i represents a particular ith data sample, O represents observable features and C represents context features.

Following the data partitioning stage 1020, the partitioned data samples 1030 are passed to a synthetic data generation stage 1040. During the synthetic data generation stage 1040, a set of synthetic data samples 1050 is generated. The synthetic data samples 1050 are generated by combining features from the two feature sets that respectively relate to two different ones of the set of uniquely identifiable entities. For example, this may be performed by adding the second set of features 1034 to a group indexed by an entity identifier, then iterating through the first set of features 1032 and randomly selecting a paired portion from the group where the entity identifier of the selected paired portion does not match the entity identifier of the corresponding first set of features portion. The synthetic data samples 1050 thus comprise mixed pairs 1052, 1054 from the first and second set of features 1032, 1034.

Following the synthetic data generation stage 1040, the original partitioned data 1030 and the synthetic data samples 1050 are passed to a data labelling stage 1060. During the data labelling stage 1060, the original partitioned data 1030 is assigned a label indicating an absence of an anomaly. In this case, that label is the numeric value "0". The synthetic data samples 1050 are then assigned a label indicating a presence of an anomaly. In this case, that label is the numeric value "1". The two sets of labelled data samples are then combined into an augmented training set 1070 comprising labelled data. As can be seen in FIG. 10, the augmented training set 1070 comprises pairs of observable features 1072 and context features 1074, e.g. as represented by separate feature vectors or sets of vector elements, and an assigned label 1076, which is "0" or "1". The augmented data set 1070 may then be used to train a binary classifier that implements the machine learning system of previous examples. For example, the augmented data set 1070 may be used to train the binary classifier 940 shown in FIG. 9, i.e. to determine the set of parameters 942. In the case that the binary classifier 940 comprises a neural network architecture, during training, a prediction from the binary classifier 940 in the form of scalar output 950 may be compared within the assigned label 1076, e.g. in a loss function, and an error based on the difference between the scalar output 950 and one of the numeric values 0 or 1 in the label may be propagated back through the neural network architecture. In this case, a differential of the loss function with respect to the weights of the neural network architecture may be determined and used to update those weights, e.g. using gradient descent or one of its variations. For example, this may be used for the neural network architecture shown in FIGS. 6A to 6C. In the case that the binary classifier 940 comprises a random forest classifier, e.g. as shown in FIG. 7, then the augmented training set may be passed as a set of data samples (the concatenation of portions 1072 and 1074) and a set of corresponding labels 1076 to a model "fitting" method (such as random_forest.fit(X, y) as defined in machine learning programming libraries).

The present training pipeline thus provides a solution to the technical problem of training an anomaly classifier on transaction data without labels. Rather than looking at an unsupervised classifier, that is generally poorer in accuracy and requires extensive calibration, the present examples adapt a feature generation process to enable the problem to be reframed as a supervised learning problem. This then allows more powerful supervised learning models to be used that are able to identify anomalies in transaction data that more closely align with deviations from expected behaviour. The present examples split the training data into two sets of features, a first set of features that are based on so-called observable features, i.e. data that is obtained from, or is computed using, a transaction that is being classified, and a second set of features that are based on so-called context features, i.e. data that is not obtained or computing using data for transaction that is being classified, e.g. features derived from historical transaction data and or look-up data relating to a particular entity or entities associated with the transaction that is being classified. Furthermore, collapsing the transaction processing into a single binary classification allows this approach to be effective, yet still allows an actionable output, e.g. for determining whether to approve or decline the transaction that is being classified.

Figure 11A:
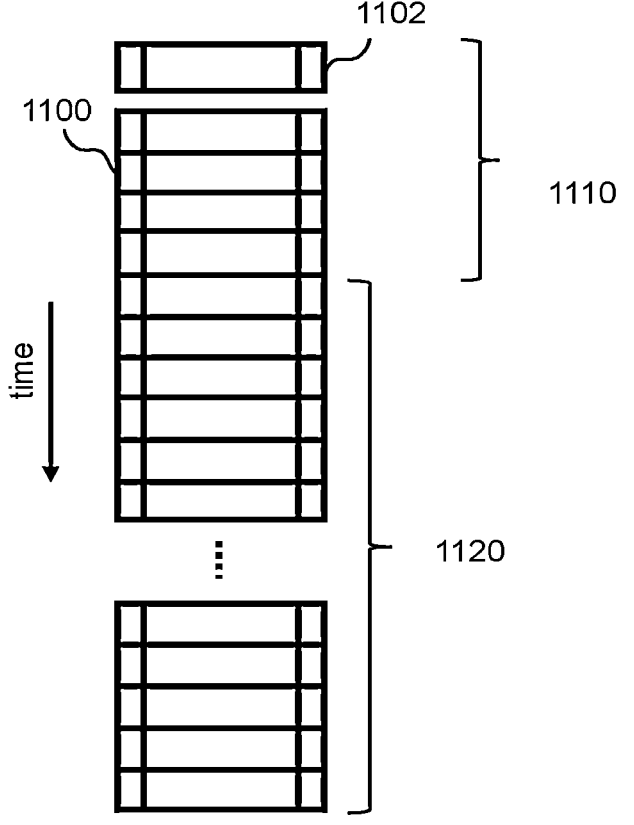
FIG. 11A is a schematic diagram showing example portions of a set of transaction data.
Figure 11B:
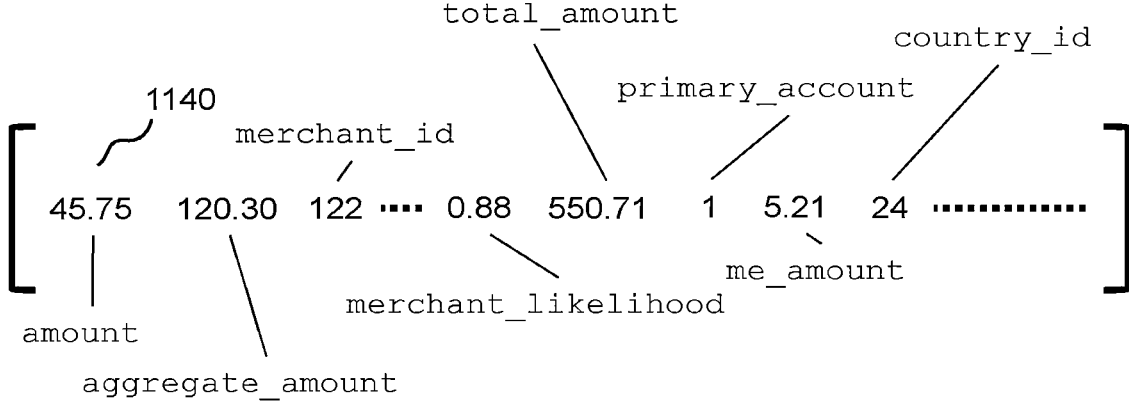
FIG. 11B is a schematic diagram showing an example feature vector.

FIGS. 11A and 11B show variations of the examples of FIGS. 3A and 3B that are relevant for the present process of training. FIG. 11A schematically shows a set of transaction data 1100 for a uniquely identifiable entity. For example, these may comprise transactions over time that are recorded for an end user such as a card holder or a particular payment account. They may also comprise transactions that are associated with a particular merchant. The transaction data 1100 may comprise records of approved transactions. FIG. 11A also shows data for a proposed transaction 1102. This may comprise received data for a proposed transaction that is yet to be approved or decline. If the transaction is approved, the data for the proposed transaction 1102 may be added to the transaction data 100.

FIG. 11A also shows how observable and context features may be defined in relation to the transaction data 1100. If each vertical portion represents data for a different transaction, then observable features may be defined as features that are computed from a first set of transaction data 1110 and context features may be defined as features that are computed from a second set of transaction data 1120. The first set of transaction data 1110 includes at least data for the proposed transaction 1102 and may be seen as raw observations of an action or behaviour that is defined based around the proposed transaction. Hence, the observable features relate to an "observation" of the current or recent behaviour of an entity, as expressed through their actions, where their actions are documented via the transaction data 1110. The second set of transaction data 1120 does not include the proposed transaction 1102 and may be used to compute historical metrics that are comparable with the data for the proposed transaction 1102. The context features may comprise predictions of the current or recent behaviour based on the actions or behaviours as represented in the second set of transaction data 1120.

FIG. 11B shows an example of a feature vector 1140. The feature vector 1140 may comprise a data sample 1012 from FIG. 10 or feature vector 930 from FIG. 9. FIG. 11B shows the feature vector 1140 following a first set of pre-processing that converts input data into numeric values. It should be noted that further pre-processing, either based on defined ranges or neural network mappings, may also be performed to further convert the numeric values that are shown into normalised values (e.g., floating point values between 0 and 1 or −1 and 1). The feature vector 1140 comprises a number of vector elements relating to different data input. For example, the feature vector 1140 comprises: an entry "amount" that defines an amount (e.g., in a local currency) for a proposed transaction; an entry "aggregate_amount" that defines a total amount spent within the first set of transaction data 1110; an entry "merchant_id" that is a unique identifier for a merchant being used for the proposed transaction; an entry "merchant_likelihood" that represents a likelihood the user entity making the proposed transaction would use the merchant defined by the merchant identifier; an entry "total_amount" that represents an aggregate metric (e.g., a sum) of transaction amounts from the second set of transaction data 1120; an entry "primary_account" that is a boolean value indicating whether the transaction is associated with a primary account of the current user entity; an entry "me_amount" that represents another aggregate metric (e.g., a median) of transaction amounts from the second set of transaction data 1120; and an entry "country_id" that represents a home country of the current user entity. In this case, the entries "amount", "aggregate_amount", and "merchant_id" may represent observable features and the remaining entries may represent context features.

Method of Training a Machine Learning System

Figure 12:
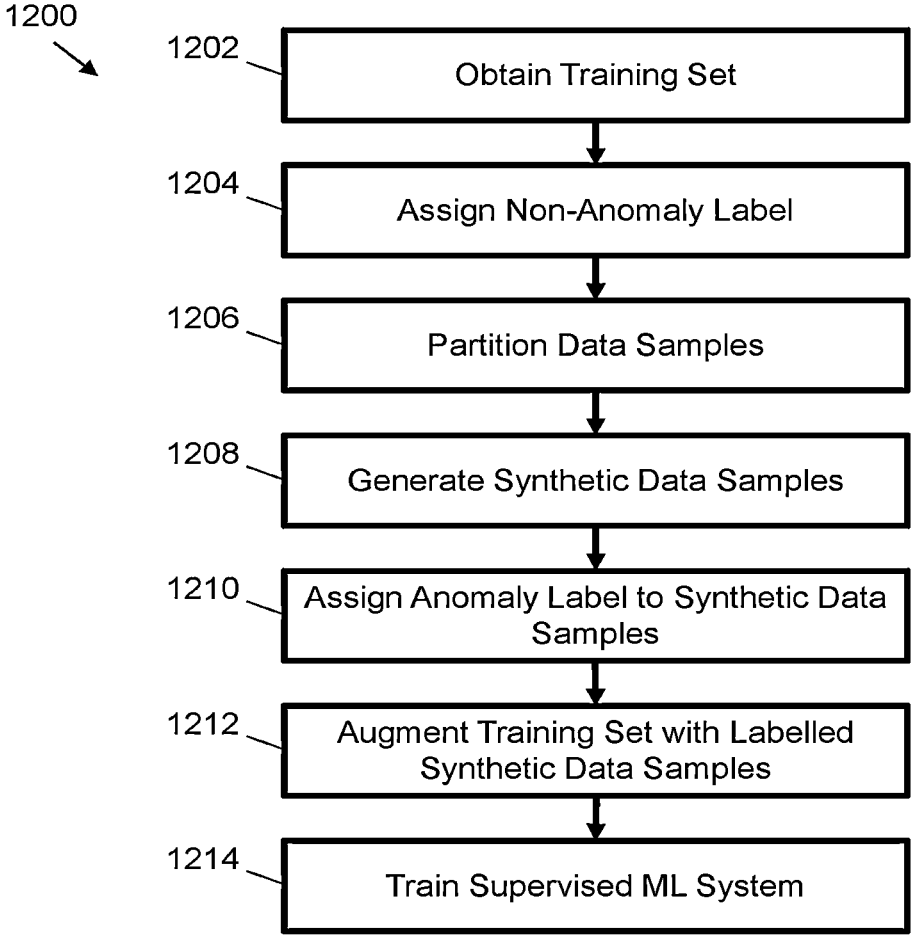
FIG. 12 is a flow chart showing an example method for training a machine learning system using synthetic data samples.

FIG. 12 shows an example method 1200 of training a supervised machine learning system to detect anomalies within transaction data. The method 1200 may be used to implement the pipeline 1000 shown in FIG. 10. At block 1202, the method 1200 comprises obtaining a training set of data samples. The data samples may comprise data samples such as 1012 in FIG. 10. Each data sample is derived, at least in part, from transaction data and is associated with one of a set of uniquely identifiable entities. For example, a data sample may have, or be retrieved based upon, one or more unique identifiers relating to a user or a merchant. In this method, at least a portion of the training set is unlabelled. For example, it may comprise feature vectors such as 1140 shown in FIG. 11B that do not have an assigned anomaly label.

At block 1204, the method 1200 comprises assigning a label indicating an absence of an anomaly to unlabelled data samples in the training set. For example, such labels may be the "0" labels shown assigned as part of labels 1076 in FIG. 10. The label may comprise a numeric value or a binary value. As the data samples are derived from transaction data, e.g. at least data 1100 as shown in FIG. 11A, they relate to transactions that have been processed are so are assumed to be representative of "normal" behaviour, e.g. of data that is expected during transaction processing.

At block 1206, the method comprises partitioning the data of the data samples in the training set into two feature sets: a first feature set representing observable features and a second feature set representing context features. The observable features are derived from a function of at least transaction data for a current transaction, e.g. a function of at least transaction data 1102 in FIG. 11A. The context features are derived from one or more of a function of historical transaction data that excludes the current transaction, and retrieved data relating to the uniquely identifiable entity for the current transaction. For example, the context features may be derived from data similar to data 922 and 924 in FIG. 9. Example partitioned features 1030 are shown in FIG. 10.

At block 1208, synthetic data samples are generated by combining features from the two feature sets that respectively relate to two different ones of the set of uniquely identifiable entities. For example, each data sample may be directly (e.g., via a present unique identifier for the entity) or indirectly (e.g., via a particular position in a data matrix) associated with a particular uniquely identifiable entity and so a context portion of a data sample may be swapped with that of another data sample that is not directly or indirectly associated with the particular uniquely identifiable entity.

At block 1210, the method 1200 comprises assigning a label indicating a presence of an anomaly to the synthetic data samples. For example, this may comprise assigning a numeric value of 1 as shown in the labels 1076 in FIG. 10. As the synthetic data samples have been generated based on mismatches between the observable and context features, they may be taken as positive examples of an anomaly for training. At block 1212, the original training set obtained at block 1202 is augmented the training set with the synthetic data samples. This may comprise concatenating the synthetic data samples to the bottom of a data matrix whose rows represent the data samples obtained at block 1202 and concatenating the "1" labels to a list of "0" labels. Block 1212 may also include shuffling the data samples following augmentation (but retaining the correspondence between data sample and assigned label).

Lastly, at block 1214, the method 1200 comprises training a supervised machine learning system with the augmented training set and the assigned labels. This may comprise applying a known training procedure with the augmented training set and the assigned labels as training data. The supervised machine learning system may be an implementation of one or more of machine learning systems 160, 210, 402, 508, 600, 700 or 940. The supervised machine learning system may comprise one or more of an ensemble system based on a set of decision trees and a recurrent neural network, e.g. as described in previous examples. Following training, e.g. following the determination of a set of learned parameter values, the trained supervised machine learning system is configured use the learned parameter values to output a value indicative of a presence of an anomaly when supplied with a new data sample.

In one case, the observable features are derived from a function of transaction data within a predefined temporal window for the current transaction. For example, this may comprise a defined time range (such as within 24 hours) and/or a defined number of transactions (e.g., the last 3 actions). The predefined temporal window may relate, for example, to the first set of transaction data 1110 as shown in FIG. 11A. The context features are then derived from transaction data outside of the predefined temporal window. For example, these may be derived from the second set of transaction data 1120 as shown in FIG. 11A.

One or more of the observable features may comprise aggregate metrics computed from transaction data for a predefined time period that is defined in relation to a time of the current transaction. For example, these observable features may comprise a statistical metric (such as mean, mode or median value) or a function as learnt by a neural network mapping. For example, the predefined time period may relate to a set of transaction data such as the first set of transaction data 1110 as shown in FIG. 11A. In this case, block 1202 may comprise, for a given data sample, obtaining transaction data for a current transaction, the transaction data comprising an identifier for a uniquely identifiable entity, and obtaining look-up data for the uniquely identifiable entity. For example, a data sample may include a unique identifier for a user, an account holder or a merchant. The obtained look-up data may comprise ancillary data such as such as 148 in FIGS. 1A to 1C or 242 in FIGS. 2A and 2B. The unique identifier may be used to retrieve ancillary data (e.g., metadata) that is indexed by the identifier, i.e. that belongs to the identified user, account holder or merchant. The transaction data for the current transaction is used to derive the first feature set and the obtained look-up data is used to derive the second feature set. Block 1202 may also comprise obtaining transaction data for the uniquely identifiable entity for the temporal window and computing one or more aggregated metrics from the transaction data. For example, the unique identifier may also be used to obtain data similar to the first set of transaction data 1110 that is shown in FIG. 11A and one or more aggregated metrics may be computed from this data to derive the first feature set. In certain cases, the historical transaction data may also be obtained for the uniquely identifiable entity. This historical transaction data may comprise transaction data that is outside the temporal window such as the second set of transaction data 1120 in FIG. 11A. One or more aggregated metrics may be computed from the historical transaction data and used to derive the second feature set.

As described with reference to FIG. 9 and other examples, the supervised machine learning system that is trained by the method 1200 may comprise a binary classifier that outputs a value within a predefined range representing a likelihood of an anomaly. The labels indicating the absence or presence of an anomaly may then comprise two numeric values, such as 0 and 1 or −1 and 1, that enable a numeric loss to be computed for training.

In certain examples, at least block 1214 may be executed at regular intervals to retrain the machine learning system. In this case, the data augmentation approach of method 1200 may be applied to the incremental data available since the last performance of block 1214. In this case, the generated labelled training data. i.e. the new data produced by the iteration of blocks 1202 to 1212 on new data, may be concatenated with the previously available data, i.e. to increase the size of the training set.

Example Method of Detecting Anomalies

Figure 13:
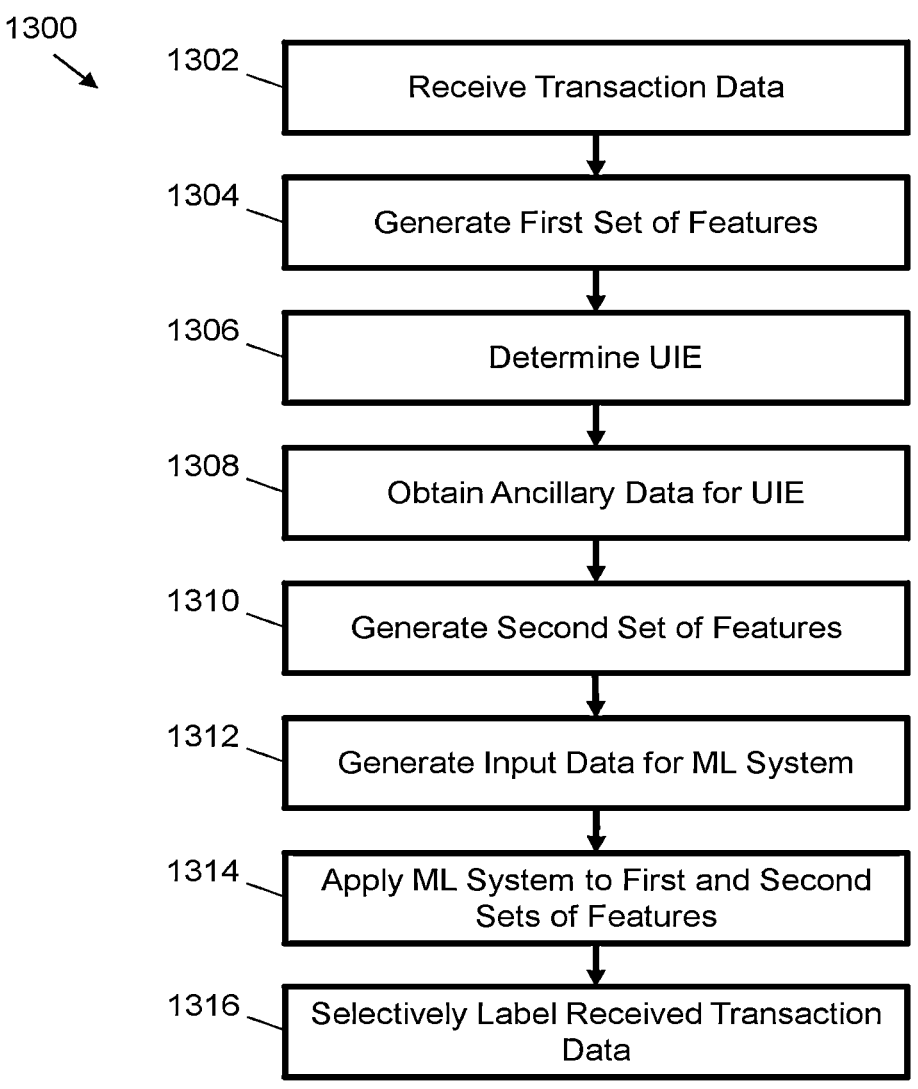
FIG. 13 is a flow chart showing an example method for applying a machine learning system.

FIG. 13 shows an example method 1300 of detecting anomalies within transaction data. The example method 1300 may be integrated with the example transaction process flows 500 and 550 of FIGS. 5A and 5B, with suitable adaptation to apply a supervised machine learning system trained using the training method explained with reference to FIGS. 9 to 12.

At block 1302, the method 1300 comprises receiving transaction data for anomaly detection. This may comprise operations similar to block 522 in FIG. 5A. The transaction data may relate to a proposed transaction, e.g. as described with reference to blocks 512 to 518 in FIGS. 5A and 5B. The transaction data may be received as data packets accompanying an API request. e.g. with respect to an internal function, or external RESTful, interface. At block 1304, a first set of features are generated based on the received transaction data. This may be performed as part of one or blocks 522 or 524 in FIGS. 5A and 5B. It may comprise applying an observable feature generator 910 to generate an observable feature vector 916 as described with reference to FIG. 9. The first set of features may be configured as a vector of numeric values that are computed based, at least, on the data packets accompanying an API request, i.e. data for a proposed transaction.

At block 1306, the method 1300 comprises determining a uniquely identifiable entity associated with the received transaction data. This may, for example, comprise parsing the API request and extracting an identifier for one or more of a user for the proposed transaction and a merchant for the proposed transaction. At block 1308, the method 1300 comprises obtaining ancillary data associated with the uniquely identifiable entity. This may comprise obtaining data such as one or more of ancillary data 148, 242 and 922 in FIGS. 1A to 1C, 2A to 2B and 9. The ancillary data may also comprise, or be computed from, historical transaction data such as one or more of transaction data 146, 240, and 924 in FIGS. 1A to 1C, 2A to 2B and 9. If an identifier is extracted, this may be used to locate and/or filter the historical transaction data based on the uniquely identifiable entity, e.g. retrieving transaction data relating to a particular user account.

At block 1310, a second set of features are generated based on the obtained ancillary data. This may comprise applying a context feature generator 920 to generate a context feature vector 926 as described with reference to FIG. 9. The second set of features may be represented as numeric values in a vector representation. In one case, historical transaction data may be processed to determine one or more of the values for said vector representation. For example, one or more statistical metrics may be computed from the historical transaction data and/or the historical transaction data may be processed by one or more neural network architectures to extract features based on a set of trained parameters. These parameters may be trained with those of the machine learning system described below. In certain cases, block 1310 may comprise obtaining historical transaction data for the uniquely identifiable entity where the historical transaction data comprises transaction data that is outside a temporal window defined in relation to the received transaction data. In this case, block 1310 may comprise computing one or more aggregated metrics from the historical transaction data and generating the second feature set from at least the one or more aggregated metrics.

At block 1312, input data is generated for a supervised machine learning system based on the generated first and second set of features. The supervised machine learning system may comprise an implementation of one or more of the machine learning systems 160, 210, 402, 600, 700 and 940 described above. The supervised machine learning system is trained based on a training set comprising historical data samples and synthetic data samples. The synthetic data samples are generated by combining features from the first and second sets of features from the historical data samples that respectively relate to two different ones of the set of uniquely identifiable entities, e.g. two different users or merchants. For example, the training set may comprise the augmented training set 1070 shown in FIG. 10, where the synthetic data samples comprise synthetic data samples 1050 and the historical data samples comprise the original training set 1010. The synthetic data samples are assigned a label indicating a presence of an anomaly for training (e.g., "1" as shown in labels 1076 in FIG. 10) and unlabelled data samples within the historical data samples are assigned a label indicating an absence of an anomaly for training (e.g., "0", as shown in labels 1076 in FIG. 10). Training may comprise applying an available model fitting function in a machine learning computer program code library. In cases where the supervised machine learning system comprises a neural network architecture, training may comprise applying backpropagation with gradient descent, using a loss function based on a difference between a prediction output by the supervised machine learning system and the assigned labels. Training may be performed at a configuration stage prior to application of the method 1300. For certain machine learning systems, training may be applied online as more data is generated (e.g., as more transactions are approved or declined as demonstrated in FIGS. 5A and 5B). Both offline and online training methods may be used depending on the selected supervised machine learning system. Generating input data may comprise generating an input feature vector similar to the input feature vector 930 shown in FIG. 9. In certain cases, pre-processing may be applied to generate the input data, including, if it has not yet been performed, converting text and categorical data to numerical equivalents, normalising data, dimensionality reduction, etc.

At block 1314, the supervised machine learning system is applied to the input data. This may comprise performing a forward pass of the supervised machine learning system, sometimes referred to as an "inference" step. The supervised machine learning system comprises a binary classifier configured to output a value indicative of a presence of an anomaly. For example, the output value may comprise a scalar value such as outputs 416 or 950 in FIGS. 4 and 9. The value may be normalised within a range of 0 to 1 (e.g., using a sigmoid non-linearity). This may be performed as described with reference to block 524 in FIGS. 5A and 5B.

At block 1316, the received transaction data is selectively labelled based on the value output by the supervised machine learning system. This may be performed by the supervised machine learning system (e.g., as described with reference to FIG. 4) and/or by a separate computing device based on the output, such as the payment processor system 506 at blocks 528 or 552 in FIGS. 5A and 5B. The labelling may comprise sending a response to the original API request with the scalar value. It may also comprise applying one or more custom post-processing computations, such as application of a threshold to output a binary label of "anomaly" or "not an anomaly".

In certain cases, block 1316 may comprise approving or declining the transaction based on the output of the supervised machine learning system. This may comprise generating control data to control whether at least one transaction within the transaction data is accepted or denied based on the value output by the supervised machine learning system. For example, in a simple case, a threshold may be applied to the output of the supervised machine learning system and values higher than the threshold (representing an "anomaly") may be declined while those below the threshold may be approved (representing "normal" actions), which a suitable decision being made for values equal to the threshold. In certain cases, such as those illustrated in FIGS. 1A to 1C and FIGS. 5A to 5B, the transaction data may be received from a point-of-sale device in relation to a transaction to be approved. In these cases, block 1316 may comprise approving the transaction response to the value output by the supervised machine learning system being below a pre-defined threshold.

In certain examples, block 1316 comprises selectively flagging the uniquely identifiable entity associated with the received transaction data based on the value output by the supervised machine learning system. For example, this may comprise flagging a user or merchant as fraudulent.

Certain examples relating to the second aspect of FIGS. 9 to 13 address a technical problem of training a machine learning system to indicate whether transactions relate to expected (i.e., normal) behaviour or relate to unexpected (i.e., anomalous) behaviour, where behaviour simply refers to a set of actions taken with respect to one or more electronic systems over time. The present examples address a problem with transaction processing, namely that there are repositories of data available but that this typically represent unlabelled historical data and that unexpected behaviour, by its very nature, is rare (e.g., less than 10% of cases are "unexpected"). The machine learning engineer is thus unable to use many conventional tools as these as designed based on an assumption of Gaussian ("normal") distributions, whereas anomalies are typically characterised by power law distributions. The machine learning engineer is further faced with a lack of labelled data to train machine learning systems. These problems are further not widely recognised in the art of machine learning, it is common for machine learning engineers to indicate that there is no solution or to try to apply unsupervised learning approaches that do not result in high accuracy results that can be used in production systems.

In contrast, the present examples of the second aspect solve a problem of identifying a large class of anomalous transactions in label-poor situations. Machine learning systems are proposed that identify transactions where observed (i.e., measured) interactions with computing systems differ from expected interactions based either on past interactions or based on ancillary information. In the present examples, a method of training is proposed that works by augmenting available data to re-pose the problem as a supervised learning problem. This allows the use of powerful supervised learning algorithms that are able to identify anomalies that more closely align with deviations from expected interactions than the comparative machine learning systems. In practice, the proposed examples allow a supervised machine learning to be trained to more accurately label transactions as fraudulent. Implementations of the present examples have been successfully tested in a production environment where transactions need to be processed at a high volume (1000-2000 transactions per second) with sub-second latencies. The machine learning systems described herein are particularly designed to output a simple scalar value—this still enables a binary approval to be based on the output yet allows machine learning configurations to be trained in the manner described herein and configured for production implementation at scale; the scalar value is small yet informative as it effectively collapses a large body of input information (e.g., input vectors with a high dimensionality) to an informational singularity. In tests, this scalar value is useable for transaction approval—it avoids false positives that can grind a production system to a halt yet also identifies true positives that align with hand-labelled anomalies. This provides a wider benefit of avoiding large scale criminal abuse of electronic payment systems.

There are a number of comparative approaches to detecting anomalies in data sets. These include unsupervised outlier detection, a Synthetic Minority Over-sampling Technique (SMOTE), the "Snorkel" system, semi-supervised learning systems and active learning systems.

In unsupervised outlier detection, features are generated that are deemed to be informative to quantify deviations from expected behaviour, where the features are input to an anomaly detection system, which is configured to identify features that, within a population of features, are outliers relative to the overall data distribution of those features. Approaches for performing unsupervised outlier detection include using tree-based isolation forests, generative adversarial networks or variational autoencoders. The paper "Variational Autoencoder based Anomaly Detection using Reconstruction Probability" by An and Cho (SNU Data Mining Center—2015-2 Special Lecture on IE), which is incorporated herein by reference, describes an anomaly detection method using the reconstruction probability from the variational autoencoder. However, these approaches are complex and difficult to reconcile with the constraints of transaction processing.

SMOTE, as described in the paper of the same name by Chawla et al, published in the Journal of Artificial Intelligence Research 16 (2002) 321-357, which is incorporated herein by reference describes an approach that over-samples a minority (abnormal) class from data samples and that under-samples a majority (normal) class. This approach however is over-reliant on "abnormal" labelled data samples, with resultant issues for accuracy. The Snorkel system is described in the paper by Ratner et al titled "Snorkel: Rapid Training Data Creation with Weak Supervision" (published on arXiv 28 Nov. 2017), which is incorporated herein by reference. It allows users to train machine learning models without hand-labelling data. It is primarily designed for text-based medical data and seeks to incorporate weak supervision sources by applying user-assigned labels to a decomposed context hierarchy. However, the Snorkel system is less suitable for the forms of data that are used within a transaction processing system and the probabilistic method of generative labelling introduces the possibilities of accuracy issues for production transaction processing systems. It also requires a source of "expert" labels.

Semi-supervised learning approaches deal with situations where there is some labelled training data but where there may be batches of unlabelled data. Most semi-supervised methods (implicitly or explicitly) infer likely labels for the unlabelled datapoints, allowing them to be used in training. However, semi-supervised approaches, like unsupervised approaches, tend to be more complex and more sensitive to hyperparameter configurations. They are also dependent on a small set of high-accuracy labels. Active learning approaches use an oracle (such as a human expert) to label a subset of the data and then use this labelled subset to apply labels to a wider set of unlabelled data. The oracle however has limited capacity, and it is important to make provident choices about which datapoints to send to the oracle. Active learning is therefore primarily directed to selecting which unlabelled datapoints to send to the oracle so as to learn as much as possible as quickly as possible.

Hence, while these approaches attempt to address the label sparsity problem in a general setting, they have a tendency to be unsuitable for a transaction processing context and further do not help solve the problem of detecting unexpected patterns of actions within that transaction data.

Certain examples of training a machine learning system described herein operate on a basis of the availability of large unlabelled data sets covering previously processed transactions, where each portion of data, such as the transaction data described with respect to FIGS. 1A to 1C, is associated (e.g., indexed) with a uniquely identifiable entity, such as a card account holder or a merchant. Examples described herein partition input data into tuples of two feature sets {C, O}, where "C" indicates a set of "context" machine learning features and "O" indicates a set of "observable" machine learning features. This tuple may relate to a specific action undertaken by an entity in relation to an electronic payment processing system, e.g. a proposed transaction. It may also, in other cases, relate to an aggregated period of action, such as a week of activity. In these examples, observable features are computed based on raw observations of such an action or of stateful aggregations of time periods that include the action, such as all actions initiated in 24 hours. Actions here may relate to the submission of requests for payment to a payment processor system. The observable features may be seen as an observation of current or recent behaviour of an entity, as expressed through their actions. The context features may be computed based on a wider set of ancillary data that is useable to predict the observable features. Context features may depend on what data sources are available and/or the configuration of the machine learning system that receives the input data to make a prediction.

Certain examples described herein may be used in a number of ways to facilitate payment processing and detected unexpected patterns of activity. In one case, context features may be computed based on likelihoods of interactions with other entities, such as different merchants, entities located in different geographical areas, different recipient entities etc. In this case, the scalar value output by the machine learning system may be used to help determine whether a malicious third party has gained access to payment data (e.g., "hacked" account details and is attempting to make a fraudulent payment). In other cases, the scalar output may be used to identify misuse of electronic systems, e.g. opening accounts with false information. In these cases, the machine learning system may be used to identify transaction histories for an entity that are inconsistent or incompatible with pre-disclosed information. For example, in these cases, observable features may be used that comprise the frequency, value and destination of transactions over a defined time period and contextual features may be used that summarise metadata associated with the entity, such as age, occupation, country of residence etc. In yet another case, the scalar output of the machine learning system may be used to determine whether a merchant is engaging in suspicious activity, such as detecting patterns of electronic behaviour that do not match expectations based on past or disclosed data. For example, contextual features in this case may comprise properties of the entity, including location information. The present examples may be applied in each of these cases.

Certain examples described herein propose a data augmentation method for training that synthesises binary labels for unlabelled historical training data. Within this method, existing data samples {C, O} within the historical training data are assigned labels indicating an absence of an anomaly. Then synthesised tuples (i.e., data samples) are generated {C, O'} or {C', O} by combining context and observable features that exist separately in the training data but that do not exist together. e.g. C from one {C, O} associated with entity_1 is paired with O' from another {C'. O'} associated with entity_2. Once trained on this augmented dataset, the machine learning system may be applied to new data samples {C*, O*} to determine if an anomaly is present. The output of the machine learning system may be used as is, or provide the basis for a further pipeline of processing (e.g., as an input feature to another machine learning system trained to predict other output data).

Certain examples described herein pose a problem of anomaly detection in transaction data as a supervised learning problem, using a combination of data partitioning of the input feature vector and a data augmentation process to provide relevant labels. The data augmentation process ensures that the 'anomaly' labels indicate anomalies in action patterns, because observable features of positively labelled data sample may be drawn from a different entity's observed actions, and thus are generated from a different entity's contextual features. This produce scalar outputs that are more accurate than comparative approaches that utilize distribution based unsupervised anomaly detection for detecting anomalies against the expectations associated with an entity's context. Through the present training process, the trained supervised machine learning system "learns" to weigh more highly specific types of data anomalies correlated with deviations from an entity's expected actions. By contrast, traditional unsupervised outlier detection methods treat all data anomalies as being of equal interest, regardless of whether the anomaly correlates with deviations from expected actions for an entity. e.g. do not take into account temporal correlations and patterns within those actions.

Certain examples relating to the second aspect described herein allows the training of a machine learning system for transaction processing without requiring positively labelled data "anomalies" to be available. This differentiates the approach from comparative upsampling, weakly-supervised and semi-supervised approaches. Furthermore, certain examples described herein address not only the problem that positive (i.e., anomalous) data samples may be missing labels but also the problem that positive data samples may be rare in the first place—this is not addressed by weakly-supervised and semi-supervised approaches. In cases where ground truth labels exist but are incredibly rare, comparative approaches in upsampling, weak labelling, active learning and semi-supervised learning are unable to address the limitations in diversity of action patterns encoded in the labelled data. The described examples allow the production of large quantities of relevant positive (i.e., anomalous) labels, facilitating the supervised machine learning system to learn complicated decisioning boundaries and automate feature extraction (for example through embeddings), both of which lead to improved performance. Moreover, certain examples described herein do not require an 'oracle' to exist for labelling data points on request, as is the case with active learning approaches, nor does our approach require input from human experts or from proxy signals, as is the case with weakly-supervised approaches.

In certain examples herein there is described a transaction processing system comprising: a transaction processing module (such as the first processing stage 603 of FIG. 6A) configured to: receive first information associated with a first proposed transaction; retrieve second information associated with at least one prior transaction that is associated with the first proposed transaction; and calculate a time-delayed algorithm using the second information to generate third information; and a weighting module (such as the second processing stage 604 of FIG. 6A) communicably coupled to the transaction processing module, wherein the weighting module is configured to: receive the third information from the neural-based processing module; apply a weighting factor to the third information to generate fourth information; and calculate at least one processing algorithm using the first information and the fourth information to generate an output, wherein the output is used by an additional transaction processing module to determine whether the first proposed transaction is fraudulent. In certain examples there is also described a method for detecting a fraudulent transaction, the method comprising: receiving, by a transaction processing module, first information associated with a first proposed transaction; retrieving, by the transaction processing module from a storage repository, second information associated with at least one prior transaction that is associated with the first proposed transaction; calculating, by the transaction processing module, a time-delayed algorithm using the second information to generate third information; receiving, by a weighting module, the third information from the transaction processing module; applying, by the weighting module, a weighting factor to the third information to generate fourth information; and calculating, by the weighting module, at least one processing algorithm using the first information and the fourth information to generate an output, wherein the output is used by an additional transaction processing module to determine whether the first proposed transaction is fraudulent.

Certain examples described herein may be implemented via instructions that are stored within a computer-readable storage medium. The computer readable medium may comprise one or more of a rotating magnetic disk, a rotating optical disk, a flash random access memory (RAM) chip, and other mechanically moving or solid-state storage media. In use, the instructions are executed by one or more of processors to cause said processor to perform the operations described above. The above embodiments, variations and examples are to be understood as illustrative. Further embodiments, variations and examples are envisaged. Although certain components of each example have been separately described, it is to be understood that functionality described with reference to one example may be suitably implemented in another example, and that certain components may be omitted depending on the implementation. It is to be understood that any feature described in relation to any one example may be used alone, or in combination with other features described, and may also be used in combination with one or more features of any other of the examples, or any combination of any other of the examples. For example, features described with respect to the system components may also be adapted to be performed as part of the described methods. Furthermore, equivalents and modifications not described above may also be employed without departing from the scope of the invention, which is defined in the accompanying claims.

The invention claimed is:

1. A method of training a supervised machine learning system to detect anomalies within transaction data stored in a first data storage device using unlabelled data samples of the transaction data, the supervised machine learning system having a binary classifier that outputs a value within a predefined range representing a likelihood of an anomaly, the method comprising:

obtaining, using a payment processor server coupled with the machine learning system, a training set of data samples, each data sample being derived, at least in part, from the transaction data and being associated with one of a set of uniquely identifiable entities, the set of uniquely identifiable entities comprising unique identifiers stored in a second data storage device and relating to a user or a merchant, wherein at least a portion of the training set is unlabelled in which data of said portion of the training set comprises feature vectors that do not have an assigned anomaly label and are thus not indicated as being associated with either normal behaviour or anomalous behaviour;

assigning, using the payment processor server, a label indicating an absence of an anomaly to the unlabelled data samples in the training set and associating the unlabelled data samples with normal behaviour of data that is expected during transaction processing;

partitioning, using the payment processor server, the data of the data samples in the training set into two feature sets, a first feature set representing observable features and a second feature set representing context features, the observable features being derived from a function of at least transaction data for a current transaction, the context features being derived from one or more of a function of historical transaction data that excludes the current transaction and retrieved data relating to the uniquely identifiable entity for the current transaction;

generating, using the payment processor server, synthetic data samples by combining features from the two feature sets that respectively relate to two different entities of the set of uniquely identifiable entities;

assigning, using the payment processor server, a label indicating a presence of an anomaly to the synthetic data samples;

augmenting, using the payment processor server, the training set with the synthetic data samples;

training, using the payment processor server, a supervised machine learning system with the augmented training set and the assigned labels to determine a set of parameters for the supervised machine learning system, wherein the trained supervised machine learning system is configured to output the value indicative of a presence of an anomaly when supplied with a new data sample by the payment processor server using the set of parameters, thereby training the binary classifier using the unlabelled data samples.

2. The method of claim 1, wherein the observable features are derived from a function of transaction data within a predefined temporal window for the current transaction and wherein the context features are derived from transaction data outside of the predefined temporal window.

3. The method of claim 2, wherein at least one of the observable features comprise comprises aggregate metrics computed from transaction data for a predefined time period that is defined in relation to a time of the current transaction.

4. The method of claim 3, wherein the step of obtaining, using the payment processor server coupled with the machine learning system, with the at least one server the training set of data samples comprises, for a given data sample:

obtaining transaction data for the current transaction, the transaction data comprising an identifier for a uniquely identifiable entity; and obtaining look-up data for the uniquely identifiable entity;

wherein the obtained transaction data is used to derive the first feature set and the obtained look-up data is used to derive the second feature set.

5. The method of claim 4, wherein the step of obtaining, using the payment processor server coupled with the machine learning system, with the at least one server the training set of data samples further comprises, for the given data sample:

obtaining transaction data for the uniquely identifiable entity for the predefined temporal window; and computing at least one aggregated metric from the transaction data, wherein the at least one aggregated metric is used to derive the first feature set.

6. The method of claim 4, wherein the step of obtaining, using the payment processor server coupled with the machine learning system, with the at least one server the training set of data samples further comprises, for the given data sample:

obtaining the historical transaction data for the uniquely identifiable entity, the historical transaction data comprising transaction data that is outside the predefined temporal window; and computing at least one aggregated metric from the historical transaction data, wherein at least one aggregated metric is used to derive the second feature set.

7. The method of claim 1, wherein the second feature set comprises metadata associated with a corresponding uniquely identifiable entity.

8. The method of claim 1, wherein the supervised machine learning system comprises a binary classifier that outputs a value within a predefined range representing a likelihood of an anomaly and wherein the labels indicating the absence or presence of an anomaly comprise two numeric values representing a binary output.

9. The method of claim 1, wherein the supervised machine learning system comprises an ensemble system based on a set of decision trees.

10. The method of claim 1, wherein the supervised machine learning system comprises a recurrent neural network.

\*   \*   \*   \*   \*